United States Patent
Cox et al.

(10) Patent No.: US 12,038,062 B2
(45) Date of Patent: Jul. 16, 2024

(54) METHOD AND APPARATUS FOR AN ADJUSTABLE DAMPER

(71) Applicant: Fox Factory, Inc., Duluth, GA (US)

(72) Inventors: Paul Cox, Capitola, CA (US); David M. Haugen, Pacific Grove, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 18/125,355

(22) Filed: Mar. 23, 2023

(65) Prior Publication Data

US 2023/0332665 A1 Oct. 19, 2023

Related U.S. Application Data

(63) Continuation of application No. 17/114,259, filed on Dec. 7, 2020, now Pat. No. 11,629,774, which is a continuation of application No. 16/416,045, filed on May 17, 2019, now Pat. No. 10,859,133, which is a continuation of application No. 13/891,469, filed on May 10, 2013, now Pat. No. 10,330,171.

(60) Provisional application No. 61/645,465, filed on May 10, 2012.

(51) Int. Cl.
| | |
|---|---|
| *F16F 9/48* | (2006.01) |
| *F16F 9/19* | (2006.01) |
| *F16F 9/348* | (2006.01) |
| *F16F 9/44* | (2006.01) |
| *F16F 9/46* | (2006.01) |
| *B62K 25/08* | (2006.01) |

(52) U.S. Cl.
CPC .................. *F16F 9/48* (2013.01); *F16F 9/19* (2013.01); *F16F 9/3481* (2013.01); *F16F 9/443* (2013.01); *F16F 9/446* (2013.01); *F16F 9/462* (2013.01); *F16F 9/486* (2013.01); *B62K 25/08* (2013.01)

(58) Field of Classification Search
CPC .. F16F 9/342; F16F 9/443; F16F 9/461; F16F 9/462; F16F 9/463; F16F 9/464; F16F 9/466; F16F 9/467; F16F 9/468; F16F 9/469; F16F 9/486; F16F 9/48; F16F 9/3481; F16F 9/19; F16F 9/446
See application file for complete search history.

(56) References Cited

U.S. PATENT DOCUMENTS

| | | | |
|---|---|---|---|
| 435,995 | A | 9/1890 | Dunlop |
| 1,078,060 | A | 11/1913 | Newman |
| 1,307,502 | A | 6/1919 | Martin |
| 1,313,763 | A | 8/1919 | Thomas |
| 1,409,849 | A | 3/1922 | Haeberlein |
| 1,468,652 | A | 9/1923 | Storey et al. |

(Continued)

FOREIGN PATENT DOCUMENTS

| | | |
|---|---|---|
| AU | 2006222732 A1 | 10/2006 |
| CN | 101468587 A | 7/2009 |

(Continued)

OTHER PUBLICATIONS

European Examination Report for EP Application No. 11188520.8, 9 pages, Mailed Jul. 19, 2022.

(Continued)

*Primary Examiner* — Nicholas J Lane

(57) ABSTRACT

A vehicle suspension damper including: a cylinder; a piston assembly; and an adjuster, wherein the piston assembly compresses fluid as it moves within the cylinder and the adjuster obstructs fluid flow from a first side of a damping piston of the piston assembly to a second side of the damping piston.

12 Claims, 19 Drawing Sheets

(56) References Cited

U.S. PATENT DOCUMENTS

| | | |
|---|---|---|
| 1,492,731 A | 5/1924 | Kerr |
| 1,560,477 A | 11/1925 | Kessler |
| 1,571,788 A | 2/1926 | Bramlette, Jr. |
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 1,970,239 A | 8/1934 | Klaas |
| 2,018,312 A | 10/1935 | Moulton |
| 2,098,119 A | 11/1937 | White |
| 2,115,072 A | 4/1938 | Hunt et al. |
| 2,122,407 A | 7/1938 | Chisholm |
| 2,186,266 A | 1/1940 | Henry |
| 2,259,437 A | 10/1941 | Dean |
| 2,354,340 A | 7/1944 | Utter |
| 2,363,867 A | 11/1944 | Isely |
| 2,379,750 A | 7/1945 | Rossman |
| 2,492,331 A | 12/1949 | Spring |
| 2,518,553 A | 8/1950 | Kieber |
| 2,540,525 A | 2/1951 | Howarth et al. |
| 2,559,633 A | 7/1951 | Maurice et al. |
| 2,588,520 A | 3/1952 | Halgren et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,778,378 A | 1/1957 | Presnell |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,853,974 A | 9/1958 | Hewitt |
| 2,879,971 A | 3/1959 | Demay |
| 2,883,181 A | 4/1959 | Hogan et al. |
| 2,897,613 A | 8/1959 | Davidson et al. |
| 2,924,304 A | 2/1960 | Patriquin |
| 2,941,629 A | 6/1960 | Etienne et al. |
| 2,967,065 A | 1/1961 | Schwendner |
| 2,973,744 A | 3/1961 | Hennells |
| 2,991,804 A | 7/1961 | Merkle |
| 3,003,595 A | 10/1961 | Patriquin et al. |
| 3,056,598 A | 10/1962 | Ransom et al. |
| 3,071,394 A | 1/1963 | John |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,107,753 A | 10/1963 | Georgette et al. |
| 3,127,958 A | 4/1964 | Szostak |
| 3,175,645 A | 3/1965 | Schafer et al. |
| 3,202,413 A | 8/1965 | Colmerauer |
| 3,206,153 A | 9/1965 | Burke |
| 3,207,270 A | 9/1965 | Ellis |
| 3,216,535 A | 11/1965 | Schultze |
| 3,238,850 A | 3/1966 | Desmarchelier |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,447,644 A | 6/1969 | Duckett |
| 3,494,606 A | 2/1970 | Hanchen |
| 3,528,700 A | 9/1970 | Janu et al. |
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,618,972 A | 11/1971 | Buhl |
| 3,621,950 A | 11/1971 | Lutz |
| 3,650,033 A | 3/1972 | Behne et al. |
| 3,701,544 A | 10/1972 | Stankovich |
| 3,714,953 A | 2/1973 | Solvang |
| 3,750,856 A | 8/1973 | Kenworthy et al. |
| 3,784,228 A | 1/1974 | Hoffmann et al. |
| 3,791,408 A | 2/1974 | Saitou et al. |
| 3,792,644 A | 2/1974 | Ferguson et al. |
| 3,795,291 A | 3/1974 | Naito et al. |
| 3,830,482 A | 8/1974 | Norris |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Yankowski et al. |
| 3,974,910 A | 8/1976 | Papai |
| 3,981,204 A | 9/1976 | Starbard et al. |
| 3,981,479 A | 9/1976 | Foster et al. |
| 3,986,118 A | 10/1976 | Madigan |
| 3,995,883 A | 12/1976 | Glaze |
| 4,007,855 A | 2/1977 | Hierath et al. |
| 4,022,113 A | 5/1977 | Blatt et al. |
| 4,032,829 A | 6/1977 | Schenavar et al. |
| 4,036,335 A | 7/1977 | Thompson et al. |
| 4,045,008 A | 8/1977 | Bauer |
| 4,072,087 A | 2/1978 | Mueller et al. |
| 4,103,881 A | 8/1978 | Simich |
| 4,106,522 A | 8/1978 | Manesse |
| 4,114,735 A | 9/1978 | Kato |
| 4,121,610 A | 10/1978 | Harms et al. |
| 4,131,657 A | 12/1978 | Ball et al. |
| 4,139,186 A | 2/1979 | Postema et al. |
| 4,153,237 A | 5/1979 | Supalla |
| 4,159,106 A | 6/1979 | Nyman et al. |
| 4,166,612 A | 9/1979 | Freitag et al. |
| 4,174,098 A | 11/1979 | Baker et al. |
| 4,183,509 A | 1/1980 | Nishikawa et al. |
| 4,236,613 A | 12/1980 | Van Der Lely |
| 4,287,812 A | 9/1981 | Izumi |
| 4,291,850 A | 9/1981 | Sharples |
| 4,305,566 A | 12/1981 | Grawunde |
| 4,311,302 A | 1/1982 | Heyer et al. |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,387,781 A | 6/1983 | Ezell et al. |
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Wolfges |
| 4,550,899 A | 11/1985 | Holley |
| 4,570,851 A | 2/1986 | Cirillo et al. |
| 4,572,317 A | 2/1986 | Isono et al. |
| 4,588,053 A | 5/1986 | Foster |
| 4,616,810 A | 10/1986 | Richardson et al. |
| 4,620,619 A | 11/1986 | Emura et al. |
| 4,624,346 A | 11/1986 | Katz et al. |
| 4,630,818 A | 12/1986 | Saarinen |
| 4,634,142 A | 1/1987 | Woods et al. |
| 4,647,068 A | 3/1987 | Asami et al. |
| 4,655,440 A | 4/1987 | Eckert |
| 4,657,280 A | 4/1987 | Ohmori et al. |
| 4,659,104 A | 4/1987 | Tanaka et al. |
| 4,660,689 A | 4/1987 | Hayashi et al. |
| 4,662,616 A | 5/1987 | Hennells |
| 4,673,194 A | 6/1987 | Sugasawa |
| 4,696,489 A | 9/1987 | Fujishiro et al. |
| 4,709,779 A | 12/1987 | Takehara |
| 4,723,753 A | 2/1988 | Torimoto et al. |
| 4,729,459 A | 3/1988 | Inagaki et al. |
| 4,732,244 A | 3/1988 | Verkuylen |
| 4,743,000 A | 5/1988 | Karnopp |
| 4,744,444 A | 5/1988 | Gillingham |
| 4,750,735 A | 6/1988 | Furgerson et al. |
| 4,765,648 A | 8/1988 | Mander et al. |

(56) References Cited

U.S. PATENT DOCUMENTS

| | | |
|---|---|---|
| 4,773,671 A | 9/1988 | Inagaki |
| 4,786,034 A | 11/1988 | Heess et al. |
| 4,802,561 A | 2/1989 | Knecht et al. |
| 4,806,082 A | 2/1989 | Schenk |
| 4,815,575 A | 3/1989 | Murty et al. |
| 4,821,852 A | 4/1989 | Yokoya |
| 4,826,207 A | 5/1989 | Yoshioka et al. |
| 4,830,395 A | 5/1989 | Foley |
| 4,836,578 A | 6/1989 | Soltis |
| 4,838,306 A | 6/1989 | Horn et al. |
| 4,838,394 A | 6/1989 | Lemme et al. |
| 4,838,527 A | 6/1989 | Holley |
| 4,846,317 A | 7/1989 | Hudgens |
| 4,858,733 A | 8/1989 | Noguchi et al. |
| 4,892,328 A | 1/1990 | Kurtzman et al. |
| 4,919,166 A | 4/1990 | Sims et al. |
| 4,936,423 A | 6/1990 | Karnopp |
| 4,936,424 A | 6/1990 | Costa |
| 4,938,228 A | 7/1990 | Righter |
| 4,949,262 A | 8/1990 | Buma et al. |
| 4,949,989 A | 8/1990 | Kakizaki et al. |
| 4,958,706 A | 9/1990 | Richardson et al. |
| 4,972,928 A | 11/1990 | Sirven |
| 4,975,849 A | 12/1990 | Ema et al. |
| 4,984,819 A | 1/1991 | Kakizaki et al. |
| 4,986,393 A | 1/1991 | Preukschat et al. |
| 5,027,303 A | 6/1991 | Witte |
| 5,031,455 A | 7/1991 | Cline |
| 5,036,934 A | 8/1991 | Nishina et al. |
| 5,040,381 A | 8/1991 | Hazen |
| 5,044,614 A | 9/1991 | Rau |
| 5,060,910 A | 10/1991 | Iwata et al. |
| 5,060,959 A | 10/1991 | Davis et al. |
| 5,072,812 A | 12/1991 | Imaizumi |
| 5,074,624 A | 12/1991 | Stauble et al. |
| 5,076,404 A | 12/1991 | Gustafsson |
| 5,080,392 A | 1/1992 | Bazergui |
| 5,094,325 A | 3/1992 | Smith |
| 5,105,918 A | 4/1992 | Hagiwara et al. |
| 5,113,980 A | 5/1992 | Furrer et al. |
| 5,127,634 A | 7/1992 | Le Gourvellec |
| 5,152,547 A | 10/1992 | Davis |
| 5,161,653 A | 11/1992 | Hare |
| 5,161,817 A | 11/1992 | Daum et al. |
| 5,163,742 A | 11/1992 | Topfer et al. |
| 5,178,242 A | 1/1993 | Nakamura et al. |
| 5,186,481 A | 2/1993 | Turner |
| 5,203,584 A | 4/1993 | Butsuen et al. |
| 5,207,300 A | 5/1993 | Engel et al. |
| 5,207,774 A | 5/1993 | Wolfe et al. |
| 5,230,364 A | 7/1993 | Leng et al. |
| 5,231,583 A | 7/1993 | Lizell |
| 5,236,169 A | 8/1993 | Johnsen et al. |
| 5,246,247 A | 9/1993 | Runkel |
| 5,248,014 A | 9/1993 | Ashiba |
| 5,259,487 A | 11/1993 | Petek et al. |
| 5,263,559 A | 11/1993 | Mettner |
| 5,265,902 A | 11/1993 | Lewis |
| 5,266,065 A | 11/1993 | Ancarani |
| 5,275,086 A | 1/1994 | Stallings, Jr. |
| 5,277,283 A | 1/1994 | Yamaoka et al. |
| 5,283,733 A | 2/1994 | Colley |
| 5,284,330 A | 2/1994 | Carlson et al. |
| 5,293,971 A | 3/1994 | Kanari |
| 5,295,074 A | 3/1994 | Williams |
| 5,295,563 A | 3/1994 | Bennett |
| 5,295,916 A | 3/1994 | Chattin |
| 5,297,045 A | 3/1994 | Williams et al. |
| 5,301,776 A | 4/1994 | Beck |
| 5,307,907 A | 5/1994 | Nakamura et al. |
| 5,310,203 A | 5/1994 | Chen |
| 5,311,709 A | 5/1994 | Kobori et al. |
| 5,318,066 A | 6/1994 | Burgorf et al. |
| 5,328,004 A | 7/1994 | Fannin et al. |
| 5,346,242 A | 9/1994 | Karnopp |
| 5,347,186 A | 9/1994 | Konotchick et al. |
| 5,348,112 A | 9/1994 | Vaillancourt |
| 5,372,223 A | 12/1994 | Dekock et al. |
| 5,372,224 A | 12/1994 | Samonil et al. |
| 5,381,952 A | 1/1995 | Duprez |
| 5,390,121 A | 2/1995 | Wolfe |
| 5,390,949 A | 2/1995 | Naganathan et al. |
| 5,392,885 A | 2/1995 | Patzenhauer et al. |
| 5,392,886 A | 2/1995 | Drummond |
| 5,396,973 A | 3/1995 | Schwemmer et al. |
| 5,398,787 A | 3/1995 | Woessner et al. |
| 5,413,196 A | 5/1995 | Forster |
| 5,445,366 A | 8/1995 | Shih et al. |
| 5,467,280 A | 11/1995 | Kimura |
| 5,475,593 A | 12/1995 | Townend |
| 5,480,011 A | 1/1996 | Nagai et al. |
| 5,485,417 A | 1/1996 | Wolf et al. |
| 5,487,006 A | 1/1996 | Kakizaki et al. |
| 5,503,258 A | 4/1996 | Clarke et al. |
| 5,507,371 A | 4/1996 | Takahashi |
| 5,517,898 A | 5/1996 | Kim et al. |
| 5,542,150 A | 8/1996 | Tu |
| 5,551,674 A | 9/1996 | Johnsen |
| 5,553,836 A | 9/1996 | Ericson |
| 5,558,190 A | 9/1996 | Chang |
| 5,566,794 A | 10/1996 | Wiard |
| 5,578,877 A | 11/1996 | Tiemann |
| 5,586,637 A | 12/1996 | Aidlin et al. |
| 5,588,510 A | 12/1996 | Wilke |
| 5,592,401 A | 1/1997 | Kramer |
| 5,597,180 A | 1/1997 | Ganzel et al. |
| 5,598,337 A | 1/1997 | Butsuen et al. |
| 5,599,244 A | 2/1997 | Ethington |
| 5,601,164 A | 2/1997 | Ohsaki et al. |
| 5,611,413 A | 3/1997 | Feigel |
| 5,634,563 A | 6/1997 | Peng |
| 5,651,433 A | 7/1997 | Wirth et al. |
| 5,657,840 A | 8/1997 | Lizell |
| 5,687,575 A | 11/1997 | Keville et al. |
| 5,697,477 A | 12/1997 | Hiramoto et al. |
| 5,699,885 A | 12/1997 | Forster |
| 5,722,645 A | 3/1998 | Reitter |
| 5,735,372 A | 4/1998 | Hamilton et al. |
| 5,803,443 A | 9/1998 | Chang |
| 5,806,159 A | 9/1998 | Ohnishi et al. |
| 5,810,128 A | 9/1998 | Eriksson et al. |
| 5,810,384 A | 9/1998 | Iwasaki et al. |
| 5,813,456 A | 9/1998 | Milner et al. |
| 5,813,731 A | 9/1998 | Newman et al. |
| 5,816,281 A | 10/1998 | Mixon |
| 5,818,132 A | 10/1998 | Konotchick et al. |
| 5,826,935 A | 10/1998 | Defreitas et al. |
| 5,828,843 A | 10/1998 | Samuel et al. |
| 5,829,733 A | 11/1998 | Becker |
| 5,833,036 A | 11/1998 | Gillespie |
| 5,850,352 A | 12/1998 | Moezzi et al. |
| 5,850,896 A | 12/1998 | Tanaka |
| 5,853,071 A | 12/1998 | Robinson |
| 5,872,418 A | 2/1999 | Wischnewskiy |
| 5,884,921 A | 3/1999 | Katsuda et al. |
| 5,937,975 A | 8/1999 | Forster |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O'Callaghan |
| 5,957,252 A | 9/1999 | Berthold |
| 5,971,116 A | 10/1999 | Franklin |
| 5,987,368 A | 11/1999 | Kamimae et al. |
| 5,988,330 A | 11/1999 | Morris |
| 5,988,332 A | 11/1999 | Marzocchi et al. |
| 5,988,655 A | 11/1999 | Sakai et al. |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,013,007 A | 1/2000 | Root et al. |
| 6,017,047 A | 1/2000 | Hoose |
| 6,029,958 A | 2/2000 | Larsson et al. |

(56) References Cited

U.S. PATENT DOCUMENTS

| | | |
|---|---|---|
| 6,035,979 A | 3/2000 | Forster |
| 6,050,583 A | 4/2000 | Bohn |
| 6,058,340 A | 5/2000 | Uchiyama et al. |
| 6,067,490 A | 5/2000 | Ichimaru et al. |
| 6,073,536 A | 6/2000 | Campbell |
| 6,073,700 A | 6/2000 | Tsuji et al. |
| 6,073,736 A | 6/2000 | Franklin |
| 6,079,526 A | 6/2000 | Nezu et al. |
| 6,092,011 A | 7/2000 | Hiramoto et al. |
| 6,092,816 A | 7/2000 | Sekine et al. |
| 6,105,988 A | 8/2000 | Turner et al. |
| 6,112,868 A | 9/2000 | Graham et al. |
| 6,120,049 A | 9/2000 | Gonzalez et al. |
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,152,856 A | 11/2000 | Studor et al. |
| 6,157,103 A | 12/2000 | Ohta et al. |
| 6,179,098 B1 | 1/2001 | Hayakawa et al. |
| 6,182,687 B1 | 2/2001 | Förster et al. |
| 6,182,805 B1 | 2/2001 | Kashiwagi et al. |
| 6,196,555 B1 | 3/2001 | Gaibler |
| 6,199,669 B1 | 3/2001 | Huang et al. |
| 6,203,026 B1 | 3/2001 | Jones |
| 6,213,263 B1 | 4/2001 | De Frenne |
| 6,215,217 B1 | 4/2001 | Kurosawa et al. |
| 6,216,078 B1 | 4/2001 | Jinbo et al. |
| 6,217,049 B1 | 4/2001 | Becker |
| 6,219,045 B1 | 4/2001 | Leahy et al. |
| 6,244,398 B1 | 6/2001 | Girvin et al. |
| 6,254,067 B1 | 7/2001 | Yih |
| 6,279,702 B1 | 8/2001 | Koh |
| 6,283,462 B1 | 9/2001 | Emmert |
| 6,290,034 B1 | 9/2001 | Ichimaru |
| 6,293,530 B1 | 9/2001 | Delorenzis et al. |
| 6,296,091 B1 | 10/2001 | Hamilton |
| 6,296,092 B1 | 10/2001 | Marking et al. |
| 6,311,962 B1 | 11/2001 | Marking |
| 6,318,525 B1 | 11/2001 | Vignocchi et al. |
| 6,321,888 B1 | 11/2001 | Reybrouck et al. |
| 6,322,468 B1 | 11/2001 | Wing et al. |
| 6,336,648 B1 | 1/2002 | Bohn |
| 6,343,807 B1 | 2/2002 | Rathbun |
| 6,352,144 B1 | 3/2002 | Brooks et al. |
| 6,359,837 B1 | 3/2002 | Tsukamoto et al. |
| 6,360,857 B1 | 3/2002 | Fox et al. |
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1 | 5/2002 | Girvin |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1 | 7/2002 | Spivey et al. |
| 6,427,812 B2 | 8/2002 | Crawley et al. |
| 6,431,573 B1 | 8/2002 | Lerman et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,460,567 B1 | 10/2002 | Hansen et al. |
| 6,467,593 B1 | 10/2002 | Corradini et al. |
| 6,474,454 B2 | 11/2002 | Matsumoto et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordaninejad et al. |
| 6,520,297 B1 | 2/2003 | Lumpkin et al. |
| 6,527,093 B2 | 3/2003 | Oliver et al. |
| 6,539,336 B1 | 3/2003 | Vock et al. |
| 6,592,136 B2 | 7/2003 | Becker et al. |
| 6,604,751 B2 | 8/2003 | Fox |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |
| 6,651,788 B1 | 11/2003 | Wohlfarth |
| 6,659,240 B2 | 12/2003 | Dernebo |
| 6,659,241 B2 | 12/2003 | Sendrea |
| 6,672,687 B2 | 1/2004 | Nishio |
| 6,676,119 B2 | 1/2004 | Becker et al. |
| 6,691,991 B1 | 2/2004 | Huang |
| 6,701,234 B1 | 3/2004 | Vogelsang et al. |
| 6,722,678 B2 | 4/2004 | McAndrews |
| 6,732,033 B2 | 5/2004 | Laplante et al. |
| 6,755,113 B2 | 6/2004 | Shih |
| 6,782,980 B2 | 8/2004 | Nakadate |
| 6,817,454 B2 | 11/2004 | Nezu et al. |
| 6,827,184 B1 | 12/2004 | Lin |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,883,650 B2 | 4/2005 | Van Wonderen et al. |
| 6,902,513 B1 | 6/2005 | McClure et al. |
| 6,905,203 B2 | 6/2005 | Kremers et al. |
| 6,920,951 B2 | 7/2005 | Song et al. |
| 6,921,351 B1 | 7/2005 | Hickman et al. |
| 6,923,853 B2 | 8/2005 | Kremers et al. |
| 6,931,958 B2 | 8/2005 | Takeda |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | McAndrews |
| 7,025,367 B2 | 4/2006 | McKinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kühnel |
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,207,912 B2 | 4/2007 | Takeda et al. |
| 7,208,845 B2 | 4/2007 | Schaefer et al. |
| 7,217,224 B2 | 5/2007 | Thomas |
| 7,234,574 B2 | 6/2007 | Matsunaga et al. |
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | McAndrews |
| 7,270,222 B1 | 9/2007 | Aymar et al. |
| 7,287,760 B1 | 10/2007 | Quick et al. |
| 7,288,038 B2 | 10/2007 | Takeda et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | Laplante et al. |
| 7,302,961 B2 | 12/2007 | Martin et al. |
| 7,306,206 B2 | 12/2007 | Turner |
| 7,316,406 B2 | 1/2008 | Kimura et al. |
| 7,320,387 B2 | 1/2008 | Sendrea |
| 7,325,660 B2 | 2/2008 | Norgaard et al. |
| 7,363,129 B1 | 4/2008 | Barnicle et al. |
| 7,373,232 B2 | 5/2008 | Guderzo |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Münster et al. |

(56) References Cited

U.S. PATENT DOCUMENTS

| | | |
|---|---|---|
| 7,484,603 B2 | 2/2009 | Fox |
| 7,490,705 B2 | 2/2009 | Fox |
| 7,512,520 B2 | 3/2009 | Sack et al. |
| 7,513,490 B2 | 4/2009 | Robertson |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,628,414 B2 | 12/2009 | Dobson et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | McAndrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,744,097 B2 | 6/2010 | Noguchi |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,828,125 B2 | 11/2010 | Sekiya et al. |
| 7,828,126 B2 | 11/2010 | Lun |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedetto et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,157,629 B2 | 4/2012 | Yanke et al. |
| 8,191,964 B2 | 6/2012 | Hsu et al. |
| 8,201,476 B2 | 6/2012 | Tsumiyama |
| 8,205,864 B2 | 6/2012 | Michel |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Thomas |
| 8,265,825 B2 | 9/2012 | Kajino et al. |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,321,177 B2 | 11/2012 | Sack et al. |
| 8,322,497 B2 | 12/2012 | Marjoram et al. |
| 8,323,454 B2 | 12/2012 | MAndrews et al. |
| 8,336,683 B2 | 12/2012 | McAndrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,459,619 B2 | 6/2013 | Trinh et al. |
| 8,480,064 B2 | 7/2013 | Talavasek |
| 8,495,947 B2 | 7/2013 | Hata |
| 8,550,223 B2 | 10/2013 | Cox et al. |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,622,180 B2 | 1/2014 | Wootten et al. |
| 8,627,930 B2 | 1/2014 | Smith et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,684,367 B2 | 4/2014 | Haugen |
| 8,727,947 B2 | 5/2014 | Tagliabue |
| 8,744,699 B2 | 6/2014 | Yamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,909,424 B2 | 12/2014 | Jordan et al. |
| 8,935,036 B1 | 1/2015 | Christensen et al. |
| 8,936,139 B2 | 1/2015 | Galasso et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,985,594 B2 | 3/2015 | Yabumoto |
| 8,991,571 B2 | 3/2015 | Murakami |
| 9,033,122 B2 | 5/2015 | Ericksen et al. |
| 9,038,791 B2 | 5/2015 | Marking |
| 9,047,778 B1 | 6/2015 | Cazanas et al. |
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,217,482 B2 | 12/2015 | Schürmann et al. |
| 9,229,712 B2 | 1/2016 | Takamoto et al. |
| 9,239,090 B2 | 1/2016 | Marking et al. |
| 9,278,598 B2 | 3/2016 | Galasso et al. |
| 9,303,712 B2 | 4/2016 | Cox |
| 9,353,818 B2 | 5/2016 | Marking |
| 9,366,307 B2 | 6/2016 | Marking |
| 9,415,659 B2 | 8/2016 | Kikuchi et al. |

(56) References Cited

U.S. PATENT DOCUMENTS

| | | |
|---|---|---|
| 9,422,018 B2 | 8/2016 | Pelot et al. |
| 9,422,025 B2 | 8/2016 | Pezzi et al. |
| 9,452,654 B2 | 9/2016 | Ericksen et al. |
| 9,523,406 B2 | 12/2016 | Galasso et al. |
| 9,528,565 B2 | 12/2016 | Marking |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2 | 5/2017 | Ericksen et al. |
| 9,682,604 B2 | 6/2017 | Cox et al. |
| 9,765,842 B2 | 9/2017 | Noguchi |
| 9,784,333 B2 | 10/2017 | Marking |
| 9,810,282 B2 | 11/2017 | Roessle et al. |
| 9,975,598 B2 | 5/2018 | Bender et al. |
| 10,012,282 B2 | 7/2018 | Kimura et al. |
| 10,029,172 B2 | 7/2018 | Galasso et al. |
| 10,036,443 B2 | 7/2018 | Galasso et al. |
| 10,040,328 B2 | 8/2018 | Marking |
| 10,040,329 B2 | 8/2018 | Ericksen et al. |
| 10,054,185 B2 | 8/2018 | Cox |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,145,435 B2 | 12/2018 | Galasso et al. |
| 10,180,171 B2 | 1/2019 | Laird et al. |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,400,847 B2 | 9/2019 | Marking |
| 10,406,883 B2 | 9/2019 | Marking |
| 10,415,662 B2 | 9/2019 | Marking |
| 10,443,671 B2 | 10/2019 | Marking |
| 10,473,179 B2 | 11/2019 | Ripa |
| 10,550,909 B2 | 2/2020 | Haugen |
| 10,591,015 B2 | 3/2020 | Galasso et al. |
| 10,604,207 B2 | 3/2020 | Winefordner et al. |
| 10,677,309 B2 | 6/2020 | Ericksen et al. |
| 10,697,514 B2 | 6/2020 | Marking |
| 10,718,397 B2 | 7/2020 | Marking |
| 10,737,546 B2 | 8/2020 | Tong |
| 10,933,709 B2 | 3/2021 | Shaw et al. |
| 11,162,555 B2 | 11/2021 | Haugen |
| 11,279,198 B2 | 3/2022 | Marking |
| 11,472,252 B2 | 10/2022 | Tong |
| 11,473,644 B2 | 10/2022 | Hansson |
| 11,519,477 B2 | 12/2022 | Marking |
| 11,708,878 B2 | 7/2023 | Marking |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |
| 2002/0050112 A1 | 5/2002 | Koch et al. |
| 2002/0050518 A1 | 5/2002 | Roustaei |
| 2002/0053493 A1 | 5/2002 | Sintorn et al. |
| 2002/0055422 A1 | 5/2002 | Airmet et al. |
| 2002/0063469 A1 | 5/2002 | Nishio |
| 2002/0089107 A1 | 7/2002 | Koh |
| 2002/0095979 A1 | 7/2002 | Shirato et al. |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0180166 A1 | 12/2002 | Voss |
| 2002/0185581 A1 | 12/2002 | Trask et al. |
| 2002/0187867 A1 | 12/2002 | Ichida et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |
| 2003/0040348 A1 | 2/2003 | Martens et al. |
| 2003/0051954 A1 | 3/2003 | Sendrea |
| 2003/0054327 A1 | 3/2003 | Evensen et al. |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1 | 8/2003 | Laplante et al. |
| 2003/0191567 A1 | 10/2003 | Gentilcore |
| 2003/0216845 A1 | 11/2003 | Williston |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0172178 A1 | 9/2004 | Takeda et al. |
| 2004/0208687 A1 | 10/2004 | Sicz et al. |
| 2004/0220708 A1 | 11/2004 | Owen et al. |
| 2004/0220712 A1 | 11/2004 | Takeda et al. |
| 2004/0222056 A1 | 11/2004 | Fox |
| 2004/0256778 A1 | 12/2004 | Verriet |
| 2005/0008992 A1 | 1/2005 | Westergaard et al. |
| 2005/0055156 A1 | 3/2005 | Maltagliati et al. |
| 2005/0056507 A1 | 3/2005 | De Molina et al. |
| 2005/0077131 A1 | 4/2005 | Russell |
| 2005/0098401 A1 | 5/2005 | Hamilton et al. |
| 2005/0104320 A1 | 5/2005 | Wesling et al. |
| 2005/0107216 A1 | 5/2005 | Lee et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0195094 A1 | 9/2005 | White |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Voss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0120080 A1 | 6/2006 | Sipinski et al. |
| 2006/0124414 A1 | 6/2006 | Hianawa |
| 2006/0136173 A1 | 6/2006 | Case et al. |
| 2006/0137934 A1 | 6/2006 | Kurth |
| 2006/0137947 A1 | 6/2006 | Fujita |
| 2006/0144311 A1 | 7/2006 | Heyring et al. |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0181034 A1 | 8/2006 | Wilde et al. |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0225979 A1 | 10/2006 | Quinn et al. |
| 2006/0231359 A1 | 10/2006 | Matsunaga et al. |
| 2006/0237272 A1 | 10/2006 | Huang |
| 2006/0253210 A1 | 11/2006 | Rosenberg |
| 2006/0254365 A1 | 11/2006 | Hamel |
| 2006/0265144 A1 | 11/2006 | Frolik |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021885 A1 | 1/2007 | Soehren |
| 2007/0021886 A1 | 1/2007 | Miyajima |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | McAndrews et al. |

(56) References Cited

U.S. PATENT DOCUMENTS

| | | |
|---|---|---|
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0213150 A1 | 9/2007 | Chattin et al. |
| 2007/0221054 A1 | 9/2007 | Webster et al. |
| 2007/0239479 A1 | 10/2007 | Arrasvuori et al. |
| 2007/0260372 A1 | 11/2007 | Langer |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0096726 A1 | 4/2008 | Riley et al. |
| 2008/0099968 A1 | 5/2008 | Schroeder |
| 2008/0108465 A1 | 5/2008 | Ichida |
| 2008/0109158 A1 | 5/2008 | Huhtala et al. |
| 2008/0116622 A1 | 5/2008 | Fox |
| 2008/0119330 A1 | 5/2008 | Chiang et al. |
| 2008/0162009 A1 | 7/2008 | Miki et al. |
| 2008/0163718 A1 | 7/2008 | Chiang |
| 2008/0170130 A1 | 7/2008 | Ollila et al. |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0000885 A1 | 1/2009 | McAndrews |
| 2009/0001684 A1 | 1/2009 | McAndrews et al. |
| 2009/0020382 A1 | 1/2009 | Van Weelden et al. |
| 2009/0038427 A1 | 2/2009 | Watarai |
| 2009/0038897 A1 | 2/2009 | Murakami |
| 2009/0048070 A1 | 2/2009 | Mncent et al. |
| 2009/0069972 A1 | 3/2009 | Templeton et al. |
| 2009/0070037 A1 | 3/2009 | Templeton et al. |
| 2009/0071772 A1 | 3/2009 | Cho et al. |
| 2009/0071773 A1 | 3/2009 | Lun |
| 2009/0098981 A1 | 4/2009 | Del et al. |
| 2009/0102628 A1 | 4/2009 | Takebayashi |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0140501 A1 | 6/2009 | Taylor et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0200127 A1 | 8/2009 | Janes |
| 2009/0200760 A1 | 8/2009 | Gartner et al. |
| 2009/0236807 A1 | 9/2009 | Wootten et al. |
| 2009/0258710 A1 | 10/2009 | Quatrochi et al. |
| 2009/0261542 A1 | 10/2009 | McIntyre |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0314592 A1 | 12/2009 | Nygren |
| 2009/0324327 A1 | 12/2009 | McAndrews et al. |
| 2010/0004097 A1 | 1/2010 | D'Eredita |
| 2010/0010709 A1 | 1/2010 | Song |
| 2010/0025946 A1 | 2/2010 | Inoue et al. |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0164705 A1 | 7/2010 | Blanchard |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0271191 A1 | 10/2010 | De Graff et al. |
| 2010/0276238 A1 | 11/2010 | Crasset |
| 2010/0276906 A1 | 11/2010 | Galasso et al. |
| 2010/0308516 A1 | 12/2010 | Galasso et al. |
| 2010/0308628 A1 | 12/2010 | Hsu et al. |
| 2010/0314917 A1 | 12/2010 | Hsieh et al. |
| 2010/0324781 A1 | 12/2010 | Gagliano |
| 2010/0326780 A1 | 12/2010 | Murakami |
| 2010/0327542 A1 | 12/2010 | Hara et al. |
| 2011/0022266 A1 | 1/2011 | Ippolito et al. |
| 2011/0035105 A1 | 2/2011 | Jolly |
| 2011/0067965 A1 | 3/2011 | McAndrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0154939 A1 | 6/2011 | Watarai et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0224901 A1 | 9/2011 | Aben et al. |
| 2011/0232147 A1 | 9/2011 | Zoellner et al. |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0074660 A1 | 3/2012 | Thomas |
| 2012/0080279 A1 | 4/2012 | Galasso et al. |
| 2012/0136537 A1 | 5/2012 | Galasso et al. |
| 2012/0166044 A1 | 6/2012 | Battlogg et al. |
| 2012/0181126 A1 | 7/2012 | De Kock |
| 2012/0221228 A1 | 8/2012 | Noumura et al. |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0265414 A1 | 10/2012 | Cheng |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0020748 A1 | 1/2013 | Kohlhauser et al. |
| 2013/0037361 A1 | 2/2013 | Park et al. |
| 2013/0081273 A1 | 4/2013 | McAndrews et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1 | 8/2013 | Zhan et al. |
| 2013/0221713 A1 | 8/2013 | Pelot et al. |
| 2013/0228404 A1 | 9/2013 | Marking |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2014/0081522 A1 | 3/2014 | Fry |
| 2015/0073656 A1 | 3/2015 | Takamoto et al. |
| 2015/0081171 A1 | 3/2015 | Ericksen et al. |
| 2015/0090547 A1 | 4/2015 | Haugen |

(56) References Cited

U.S. PATENT DOCUMENTS

| | | |
|---|---|---|
| 2015/0141056 A1 | 5/2015 | Fefilatyev et al. |
| 2015/0175236 A1 | 6/2015 | Walthert et al. |
| 2015/0179062 A1 | 6/2015 | Ralston et al. |
| 2015/0191069 A1 | 7/2015 | Zuleger et al. |
| 2015/0197308 A1 | 7/2015 | Butora et al. |
| 2015/0226283 A1 | 8/2015 | Marking |
| 2015/0233442 A1 | 8/2015 | Noguchi |
| 2015/0276000 A1 | 10/2015 | Kimura et al. |
| 2015/0290993 A1 | 10/2015 | Dillman et al. |
| 2015/0291248 A1 | 10/2015 | Fukao et al. |
| 2016/0003320 A1 | 1/2016 | Kamakura et al. |
| 2016/0025178 A1 | 1/2016 | Kamakura et al. |
| 2016/0031506 A1 | 2/2016 | Lloyd et al. |
| 2016/0076617 A1 | 3/2016 | Marking |
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0200163 A1 | 7/2016 | Tsukahara |
| 2016/0200164 A1 | 7/2016 | Tabata et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2016/0364989 A1 | 12/2016 | Speasl et al. |
| 2017/0008363 A1 | 1/2017 | Ericksen et al. |
| 2017/0088234 A1 | 3/2017 | Komada et al. |
| 2017/0136843 A1 | 5/2017 | Marking |
| 2017/0184174 A1 | 6/2017 | Marking |
| 2017/0227083 A1 | 8/2017 | Janes |
| 2017/0247072 A1 | 8/2017 | Laird et al. |
| 2017/0259876 A1 | 9/2017 | Ericksen et al. |
| 2017/0268595 A1 | 9/2017 | Inagaki et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0118302 A1 | 5/2018 | Fukao et al. |
| 2018/0150764 A1 | 5/2018 | Stenneth |
| 2018/0156300 A1 | 6/2018 | Sakai |
| 2018/0174446 A1 | 6/2018 | Wang |
| 2018/0208011 A1 | 7/2018 | Wigg et al. |
| 2018/0222541 A1 | 8/2018 | Madau et al. |
| 2018/0304149 A1 | 10/2018 | Galasso et al. |
| 2018/0326805 A1 | 11/2018 | Marking |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355943 A1 | 12/2018 | Cox |
| 2018/0355946 A1 | 12/2018 | Ericksen et al. |
| 2019/0030975 A1 | 1/2019 | Galasso et al. |
| 2019/0031264 A1 | 1/2019 | Laird et al. |
| 2019/0032745 A1 | 1/2019 | Marking |
| 2019/0092116 A1 | 3/2019 | Magnus et al. |
| 2019/0154100 A1 | 5/2019 | Coaplen et al. |
| 2019/0176557 A1 | 6/2019 | Marking et al. |
| 2019/0184782 A1 | 6/2019 | Shaw et al. |
| 2019/0203798 A1 | 7/2019 | Cox et al. |
| 2019/0247744 A1 | 8/2019 | Galasso et al. |
| 2019/0249769 A1 | 8/2019 | Hamed |
| 2019/0263474 A1 | 8/2019 | Hamed |
| 2019/0301598 A1 | 10/2019 | Sonenthal |
| 2020/0191227 A1 | 6/2020 | Laird |
| 2021/0139102 A1 | 5/2021 | Komada et al. |
| 2022/0252129 A1 | 8/2022 | Haugen |

FOREIGN PATENT DOCUMENTS

| | | |
|---|---|---|
| DE | 1555311 A1 | 8/1970 |
| DE | 3241901 A1 | 5/1984 |
| DE | 3613386 A1 | 10/1986 |
| DE | 3532292 A1 | 3/1987 |
| DE | 3536655 A1 | 4/1987 |
| DE | 3709447 A1 | 10/1988 |
| DE | 3711442 A1 | 10/1988 |
| DE | 3738048 A1 | 5/1989 |
| DE | 3924166 C1 | 2/1991 |
| DE | 4022099 C1 | 12/1991 |
| DE | 4029090 A1 | 3/1992 |
| DE | 4406918 A1 | 9/1994 |
| DE | 19757276 A1 | 6/1999 |
| DE | 202004005229 U1 | 8/2004 |
| DE | 10326675 A1 | 12/2004 |
| DE | 102005025811 A1 | 12/2006 |
| DE | 102007056313 A1 | 5/2009 |
| DE | 102007063365 A1 | 7/2009 |
| DE | 202008015968 U1 | 4/2010 |
| DE | 202010012738 U1 | 12/2010 |
| EP | 207409 A2 | 1/1987 |
| EP | 304801 A2 | 3/1989 |
| EP | 0306819 A2 | 3/1989 |
| EP | 0403803 A1 | 12/1990 |
| EP | 552568 A1 | 7/1993 |
| EP | 0735280 A2 | 10/1996 |
| EP | 0806587 A1 | 11/1997 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1662167 A1 | 5/2006 |
| EP | 1757473 A2 | 2/2007 |
| EP | 1825220 A2 | 8/2007 |
| EP | 2103512 A2 | 9/2009 |
| EP | 2116739 A2 | 11/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| EP | 2567839 B1 | 3/2019 |
| EP | 3786049 A1 | 3/2021 |
| FR | 1343760 A | 11/1963 |
| FR | 2432424 A1 | 2/1980 |
| FR | 2449236 A1 | 9/1980 |
| FR | 2529002 A2 | 12/1983 |
| FR | 2617928 A1 | 1/1989 |
| FR | 2952031 A1 | 5/2011 |
| GB | 806307 A | 12/1958 |
| GB | 1185074 A | 3/1970 |
| GB | 2104183 A | 3/1983 |
| GB | 2159234 A | 11/1985 |
| GB | 2159604 A | 12/1985 |
| GB | 2180320 A | 3/1987 |
| GB | 2190461 A | 11/1987 |
| GB | 2282864 A | 4/1995 |
| GB | 2289111 A | 11/1995 |
| GB | 2347479 A | 9/2000 |
| JP | 57173632 A | 10/1982 |
| JP | 57173632 U | 11/1982 |
| JP | 57182506 A | 11/1982 |
| JP | 01106721 A | 4/1989 |
| JP | H0193637 A | 4/1989 |
| JP | H02168038 A | 6/1990 |
| JP | H03113139 A | 5/1991 |
| JP | 04203540 A | 7/1992 |
| JP | 05149364 A | 6/1993 |
| JP | H05319054 A | 12/1993 |
| JP | 06101735 A | 4/1994 |
| JP | 06185562 A | 7/1994 |
| JP | H084818 A | 1/1996 |
| JP | 2005119548 A | 5/2005 |
| JP | 2005119549 A | 5/2005 |

(56) References Cited

FOREIGN PATENT DOCUMENTS

| | | | |
|---|---|---|---|
| JP | 2007302211 A | 11/2007 | |
| JP | 2008238921 A | 10/2008 | |
| KR | 19980043226 U | 9/1998 | |
| KR | 20070076226 A | 7/2007 | |
| KR | 20100041679 A | 4/2010 | |
| RU | 2469224 C1 | 12/2012 | |
| WO | 9840231 A2 | 9/1998 | |
| WO | 99/06231 | 2/1999 | |
| WO | 0027658 A1 | 5/2000 | |
| WO | 03070546 A1 | 8/2003 | |
| WO | 2006065235 A2 | 6/2006 | |
| WO | 2007017739 A2 | 2/2007 | |
| WO | 2007117884 A2 | 10/2007 | |
| WO | 2008086605 A1 | 7/2008 | |
| WO | 2008114445 A1 | 9/2008 | |
| WO | 2013066159 A1 | 5/2013 | |
| WO | 2021066819 A1 | 4/2021 | |

OTHER PUBLICATIONS

European Examination Report for European Application No. 11275170.6, 6 pages, Oct. 20, 2022.
European Search Report for European Application No. 19193903.2, 6 pages, Oct. 19, 2021 (Oct. 19, 2021).
European Search Report for European Application No. 19155995, 11 pages, Aug. 28, 2019.
European Search Report for European Application No. 19157965.5, 7 pages, Mar. 24, 2020 (Mar. 24, 2020).
European Search Report for European Application No. 19206334.5, 6 pages, May 12, 2020 (May 12, 2020).
European Search Report for European Application No. 19212356.0, 8 pages, May 7, 2020 (May 7, 2020).
European Search Report for European Application No. 20154392.3, 7 pages, Jul. 2, 2020 (Jul. 2, 2020).
European Search Report for European Application No. 20206708.8, 11 pages, May 17, 2021.
Machine translation DE3613386; Oct. 1986.
Machine translation EP 0403803; Dec. 1990.
Machine translation KR20100041679; Apr. 2010.
European Search Report for European Application No. 19157767, filed Oct. 16, 2019, 9 Pages.
European Search Report for European Application No. 21170685.8, Nov. 10, 2021, 8 Pages.
EP Search Report for European Application No. 21173940.4, Nov. 12, 2021, 9 Pages.
European Search Report for European Application No. 20187747, filed Nov. 18, 2020, 11 Pages.
Fachkunde Fahrradtechnik 4 Auflage, Gressmann_Inhaltv und S, 2011, 206-207.
Statement of Grounds of Appeal, EP App. No. 11153607.4, May 28, 2018, 88 Pages.
Grounds of Appeal, EP App. No. 11153607.4, Jun. 1, 2018, 28 Pages.
"17 Years of Innovation and Still Evolving", https://www.powertap.com/post/blog-15-17-years-of-innovation-and-still-evolving, Nov. 28, 2018, 8 Pages.
"ANT Message Protocol and Usage", Dynastream Innovations, Inc., Jul. 2, 2007, 68 Pages.
"Basis For Claims Filed Jan. 15, 2023", European Patent Application No. 14189773.6, 2 Pages.
"Communication Re Oral Proceedings for European Application No 10161906, dated Feb. 15, 2013 (Feb. 15, 2013)".
"European Search Report for European Application No. 09159949, 2 pages, Sep. 11, 2017 (Sep. 11, 2017)".
"European Search Report for European Application No. 10161906, 3 pages, Sep. 15, 2010 (Sep. 15, 2010)".
"European Search Report for European Application No. 11172612 , 2 pages, Oct. 6, 2011 (Oct. 6, 2011))".
"European Search Report for European Application No. 11275170 , 2 pages, Jan. 10, 2018 (Jan. 10, 2018)".
"European Search Report for European Application No. 12170370 , 2 pages, Nov. 15, 2017 (Nov. 15, 2017)".
"European Search Report for European Application No. 13158034 , 4 pages, Jun. 28, 2013 (Jun. 28, 2013))".
"European Search Report for European Application No. 15167426 , 4 pages, Sep. 18, 2015 (Sep. 18, 2015))".
"European Search Report for European Application No. 16167306 , 2 pages, Mar. 23, 2017 (Mar. 23, 2017)".
"European Search Report for European Application No. 17188022 , 9 pages, Feb. 1, 2018 (Feb. 1, 2018))".
"European Search Report for EP Application No. 18154672, 3 pages, Mailed Aug. 28, 2018 (Aug. 28, 2018))".
"Notice of Intent to Grant EP Application 09159949.8 mailed Nov. 14, 2019, pp. 48".
"Office Action for European Application No. 13158034.2, 5 pages, Mailed May 22, 2014".
"The Lee Company Technical Hydraulic Handbook", 1996, 1-696.
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Kensuke, Suspension Control Device, machine translation of JPH05319054 (A), Dec. 3, 1993 (Year: 1993).
Litchfield, "Pneumatic Tires", Transactions (Society of Automobile Engineers), vol. 8, Part II, 1913, 208-223.
Puhn, "How To Make Your Car Handle", HPBooks, 1981, 7 Pages.
Thum, Notice of Opposition to a European Patent, EP App. No. 14189773.6, Dec. 13, 2018, 49 Pages.
Thum, "Oppostion Letter Against EP2357098", Oct. 16, 2018, 39.
Thum, "Oppostion Letter Against EP2357098", Dec. 17, 2019, 25 Pages.
Waechter, et al., "A Multibody Model for the Simulation of Bicycle Suspension Systems", Vehicle System Dynamics, vol. 37, No. 1, 2002, 3-28.
Electronic Translation of DE3709447A1.
English language abstract for EP 0207409 (no date).
European Search Report, European Patent Application No. 14189773.6, May 4, 2015, 4 Pages.
EP Search Report for European Application No. 15163428.4, Jul. 3, 2017, 7 Pages.
"European Patent Office Final Decision dated Mar. 21, 2013", European Patent Application No. 10161906.2.
"European Search Report for European Application No. 09177128, 4 pages, Aug. 25, 2010 (Aug. 25, 2010)".
"European Search Report for European Application No. 10187320, 12 pages, Sep. 25, 2017 (Sep. 25, 2017)".
"European Search Report for European Application No. 11153607, 3 pages, Aug. 10, 2012 (Aug. 10, 2012)".
"European Search Report for European Application No. 11172553, 2 pages, Sep. 25, 2017 (Sep. 25, 2017)".
"European Search Report for European Application No. 11175126, 2 pages, Sep. 25, 2017 (Sep. 25, 2017)".
"European Search Report for European Application No. 12184150, 10 pages, Dec. 12, 2017 (Dec. 12, 2017)".
"European Search Report for European Application No. 13174817.0, 13 pages, Jan. 8, 2018 (Jan. 8, 2018))".
"European Search Report for European Application No. 13189574, 2 pages, Feb. 19, 2014 (Feb. 19, 2014)".
"European Search Report for European Application No. 17154191, 2 pages, Jun. 28, 2017 (Jun. 28, 2017)".
"European Search Report and Written Opinion, European Patent Application No. 13165362.8", Sep. 24, 2014, 6 Pages.
Nilsson, "Opposition Letter Against EP-2357098", Oct. 13, 2017, 7.
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.
Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.

(56) References Cited

OTHER PUBLICATIONS

Haller, E, EPO machine translation of CN 101468587 (A) Device with a suspension system and method for setting a suspension system, published on Jul. 1, 2009.

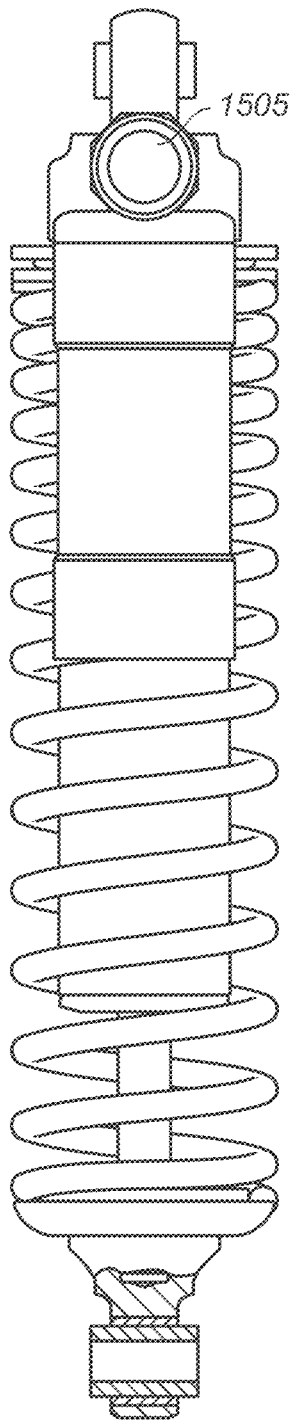
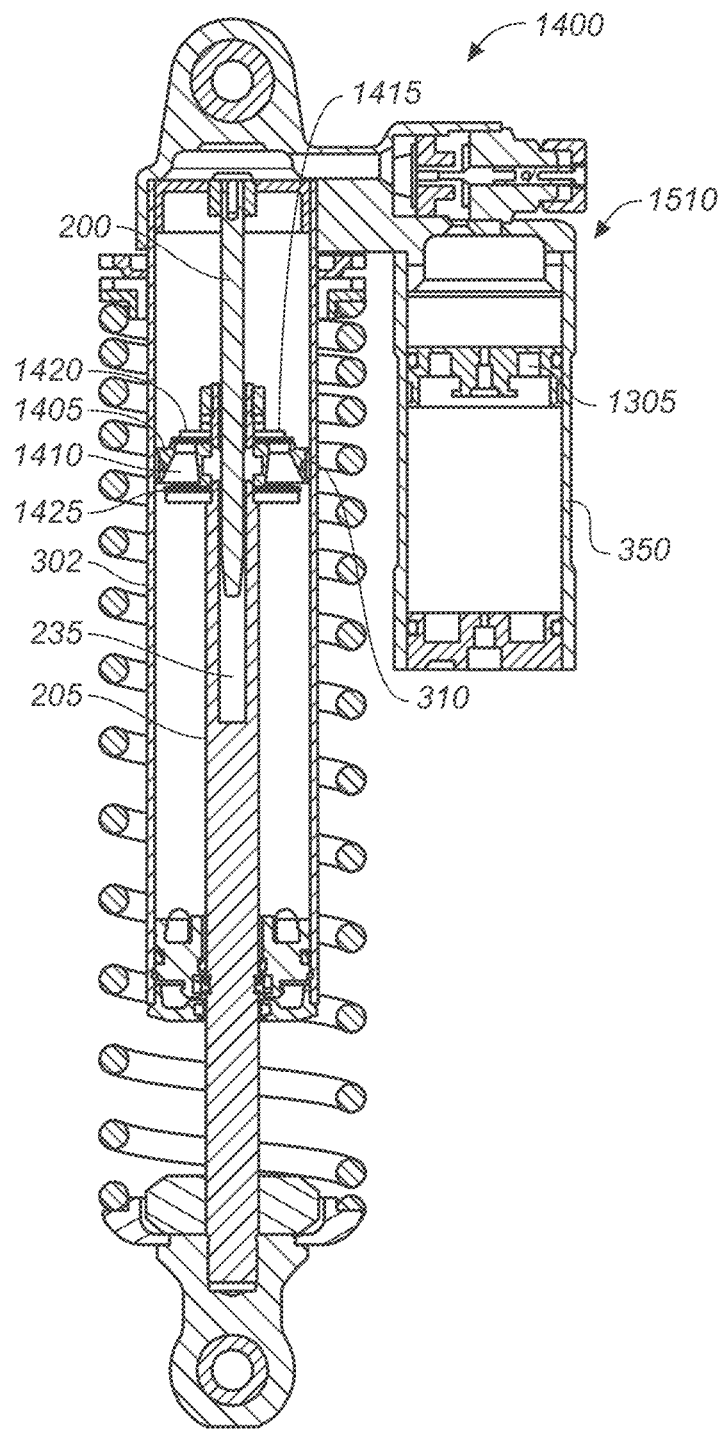
FIG. 14A
FIG. 14B

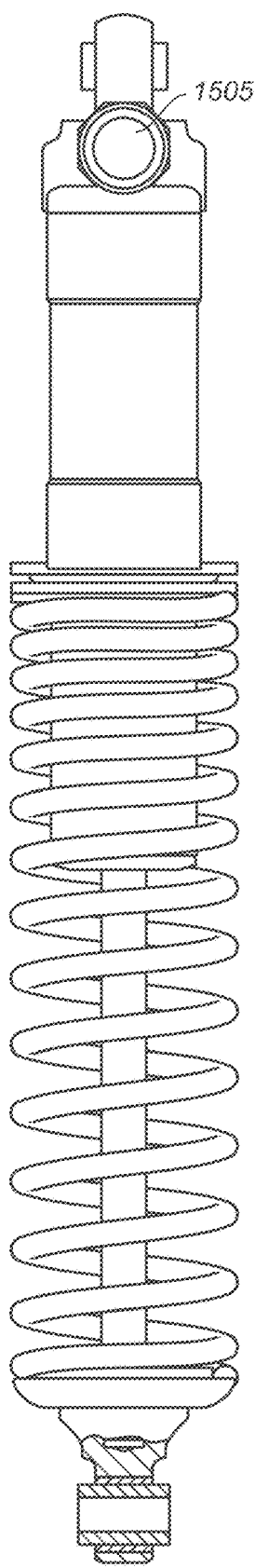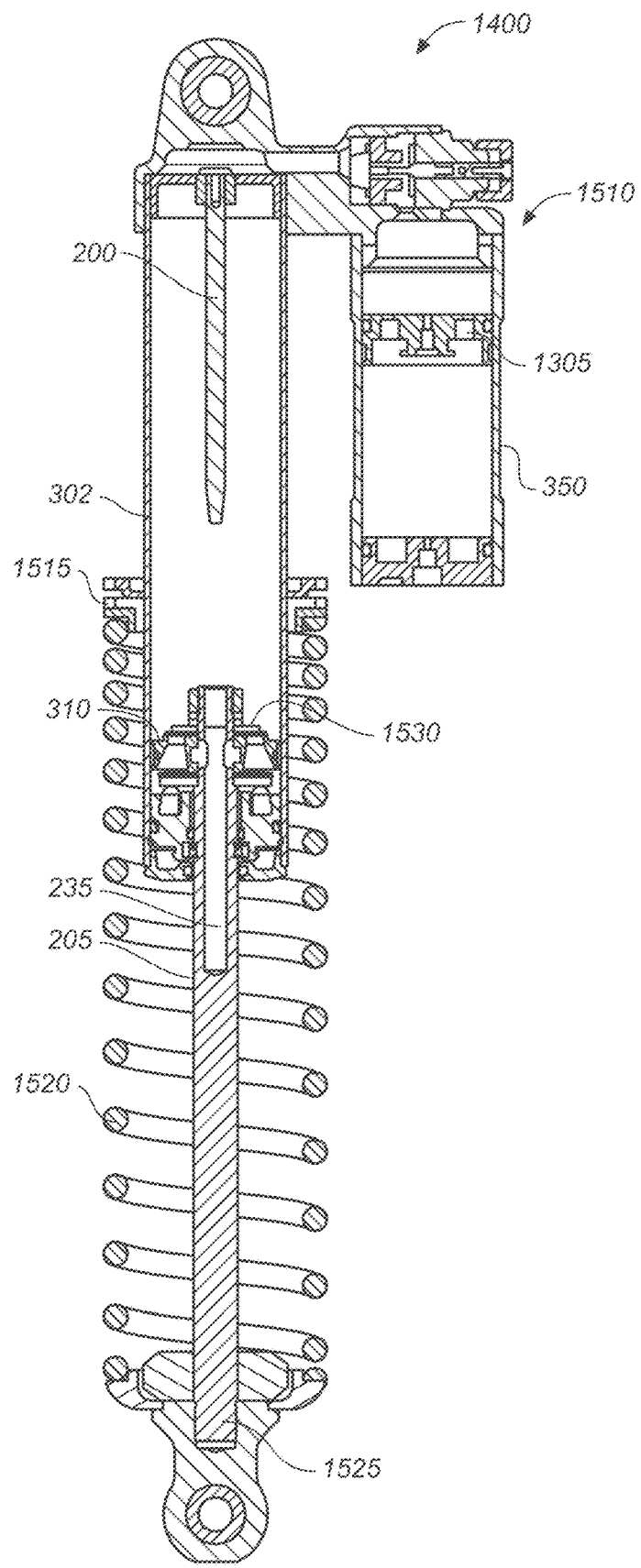
*FIG. 15A*  *FIG. 15B*

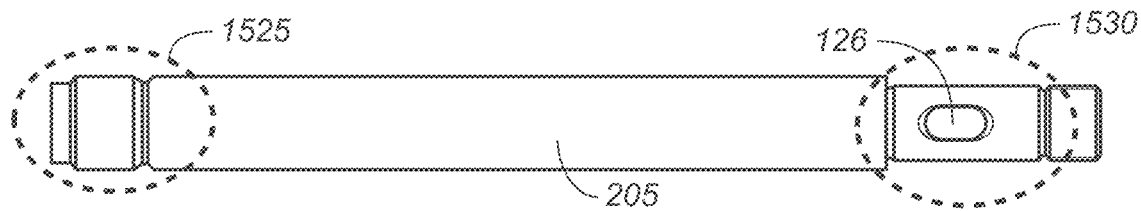
FIG. 17A
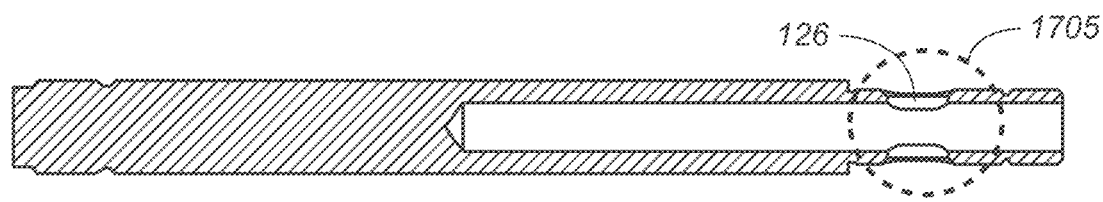
FIG. 17B
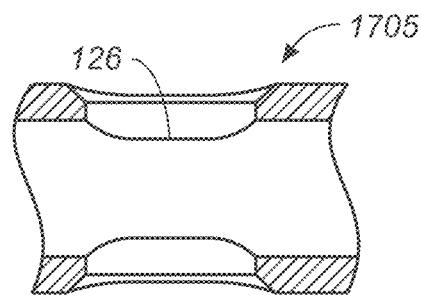
FIG. 17C
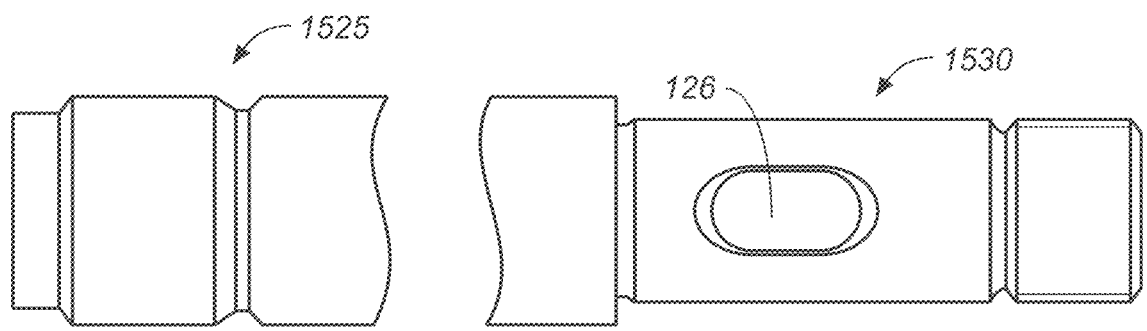
FIG. 17D   FIG. 17E

METHOD AND APPARATUS FOR AN ADJUSTABLE DAMPER

CROSS-REFERENCE TO RELATED APPLICATIONS

This application claims priority to and is a continuation of the patent application Ser. No. 17/144,259, filed on Dec. 7, 2020, entitled "METHOD AND APPARATUS FOR AN ADJUSTABLE DAMPER" by Cox et al., assigned to the assignee of the present application, having and is hereby incorporated by reference in its entirety herein.

The Ser. No. 17/114,259 application claims priority to and is a continuation of the patent application Ser. No. 16/416,045, filed on May 17, 2019, Now U.S. Issued U.S. Pat. No. 10,859,133, entitled "METHOD AND APPARATUS FOR AN ADJUSTABLE DAMPER" by Cox et al., assigned to the assignee of the present application, and is hereby incorporated by reference in its entirety herein.

The Ser. No. 16/416,045 application claims priority to and is a continuation of the patent application Ser. No. 13/891,469, filed on May 10, 2013, Now U.S. Issued U.S. Pat. No. 10,330,171, entitled "METHOD AND APPARATUS FOR AN ADJUSTABLE DAMPER" by Cox et al., assigned to the assignee of the present application, is hereby incorporated by reference in its entirety herein.

The Ser. No. 13/891,469 application claims the benefit of and claims priority of U.S. provisional patent application Ser. No. 61/645,465, filed on May 10, 2012, entitled "METHOD AND APPARATUS FOR AN ADJUSTABLE DAMPER" by Cox et al., assigned to the assignee of the present application, and is hereby incorporated by reference in its entirety herein.

This patent application is related to, and contemplates integration with, the subject matter of: U.S. provisional patent application Ser. No. 61/361,127, filed on Jul. 2, 2010, by John Marking, which is incorporated herein by reference; U.S. provisional patent application Ser. No. 61/491,858, filed on May 31, 2011, by Everet Ericksen, which is incorporated herein by reference; U.S. provisional patent application Ser. No. 61/296,826, filed on Jan. 20, 2010, by John Marking, which is incorporated herein by reference; U.S. provisional patent application Ser. No. 61/143,152, filed Jan. 7, 2009, by John Marking, which is herein incorporated by reference; U.S. patent application Ser. No. 12/684,072 (the "'072 Application"), filed on Jan. 7, 2010, now, by John Marking, which is herein incorporated by reference; and U.S. patent application Ser. No. 13/485,401, filed on May 31, 2012, by Ericksen et al., which is herein incorporated by reference.

BACKGROUND

Field of the Invention

Embodiments generally relate to a damper assembly for a vehicle. More specifically, the invention relates to a "fluid bypass" for use with a vehicle suspension.

Description of the Related Art

Vehicle suspension systems typically include a spring component or components and a dampening component or components. Typically, mechanical springs, like helical springs are used with some type of viscous fluid-based dampening mechanism and the two are mounted functionally in parallel. In some instances, a spring may comprise pressurized gas and features of the damper or spring are user-adjustable, such as by adjusting the air pressure in a gas spring. A damper may be constructed by placing a damping piston in a fluid-filled cylinder (e.g., liquid such as oil). As the damping piston is moved in the cylinder, fluid is compressed and passes from one side of the piston to the other side. Often, the piston includes vents there-through which may be covered by shim stacks to provide for different operational characteristics in compression or extension.

Conventional damping components provide a constant damping rate during compression or extension through the entire length of the stroke. As the suspension component nears full compression or full extension, the damping piston can "bottom out" against the end of the damping cylinder. Allowing the damping components to "bottom out" may cause the components to deform or break inside the damping cylinder.

As the foregoing illustrates, what is needed in the art are improved techniques for varying the damping rate including to lessen the risk of the suspension "bottoming out".

BRIEF DESCRIPTION OF THE DRAWINGS

FIG. 14A depicts a perspective view of aspects of embodiments, in a compressed position, in accordance with embodiments.

FIG. 14B depicts a cross-sectional side elevation view of FIG. 14A, aspects of embodiments having a "piggy back" reservoir (versus a monotube), in a compressed position, in accordance with embodiments.

FIG. 15A depicts a perspective view of aspects of embodiments, in an extended position, in accordance with embodiments.

FIG. 15B depicts a cross-sectional side elevation view of FIG. 15A, aspects of embodiments having a "piggy back" reservoir (versus a monotube), in an extended position, in accordance with embodiments.

FIG. 17A depicts a perspective view of a shaft 205, in accordance with an embodiment.

FIG. 17B depicts a cross-sectional view of the shaft 205 of FIG. 17A, in accordance with an embodiment.

FIG. 17C depicts an enlarged view of the detail 1705 of FIG. 17B, in accordance with an embodiment.

FIG. 17D depicts an enlarged view of the detail 1525 of FIG. 17A, in accordance with an embodiment.

FIG. 17E depicts an enlarged view of the detail 1530 of FIG. 17A, in accordance with an embodiment.

Figure 1A:
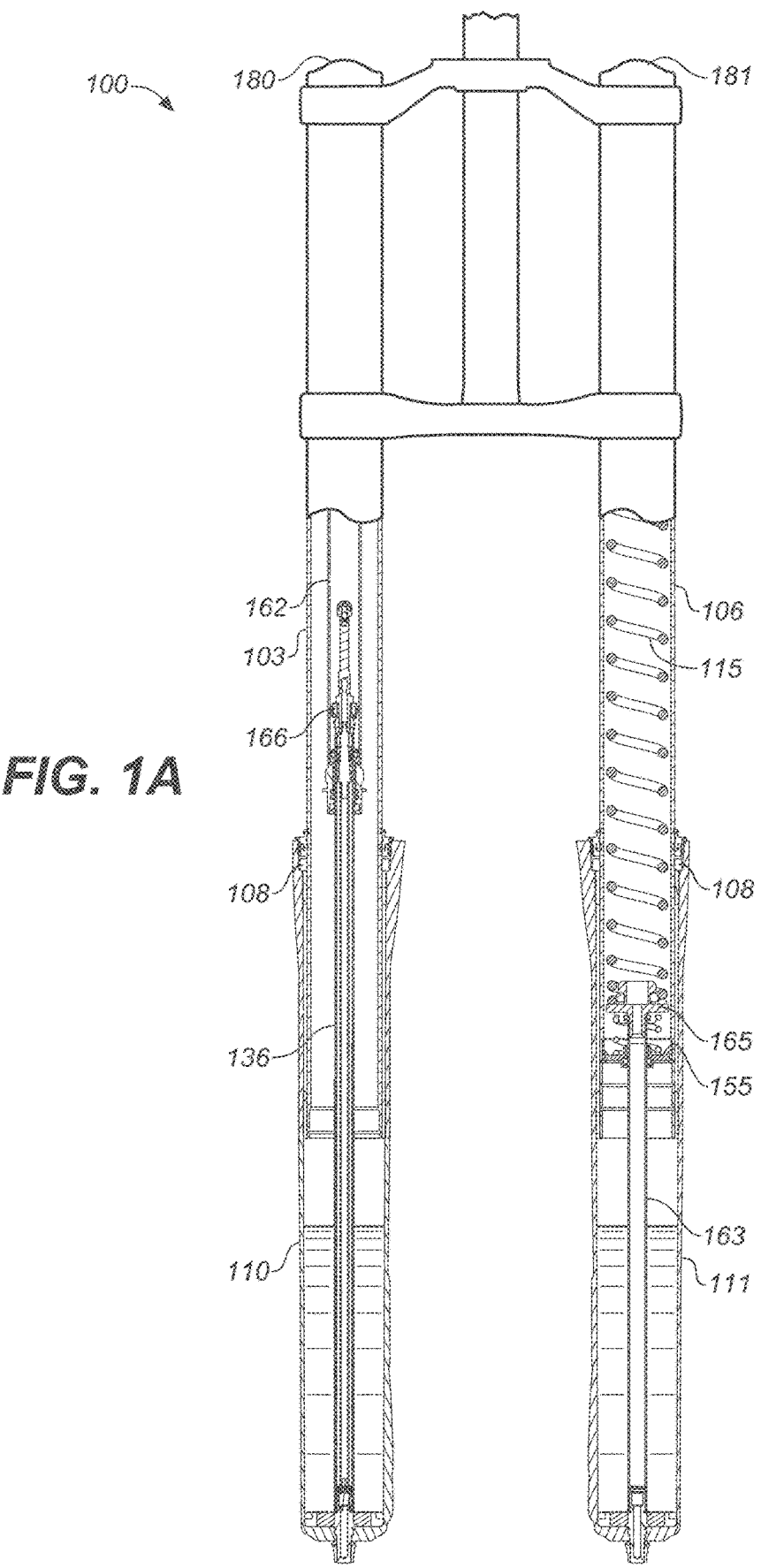
FIG. 1A depicts an asymmetric bicycle fork having a damping leg and a spring leg, according to an embodiment.

The drawings referred to in this description should be understood as not being drawn to scale except if specifically noted.

SUMMARY

An embodiment of the present technology, a vehicle suspension damper, includes: a cylinder; a piston assembly; and an adjuster coupled with the piston assembly, wherein the piston assembly compresses fluid as it moves within the cylinder and the adjuster obstructs fluid flow from a first side of a damping piston of the piston assembly to a second side of the damping piston.

In one embodiment, the adjuster of the vehicle suspension damper includes: a rotatable valve configured for rotating from a first position to a second position. The rotatable valve includes: at least one passageway there through, wherein when the rotatable valve is in at least one of the first position and the second position, the fluid flow is obstructed in its flow through the at least one passageway and from the first side of the damping piston to the second side of the damping piston. In one embodiment, the adjuster of the vehicle suspension damper including the rotatable valve, further includes a damping adjustment lever coupled with the rotatable valve, the damping adjustment lever being movable and configured for, upon movement of the damping adjustment lever, rotating the rotatable valve from the first position to the second position. In one embodiment the adjuster of the vehicle suspension damper that includes the rotatable valve and the damping adjustment lever, further includes a control rod rotationally fixed to the damping adjustment lever and the rotatable valve, wherein the control rod rotationally responds to the movement of the damping adjustment lever by rotating the rotatable valve in proportion to the movement.

In one embodiment, the adjuster of the vehicle suspension damper that includes the rotatable valve further includes a motive source coupled with the rotatable valve, the motive source configured for providing input, wherein in response to the input, the rotatable valve rotates from the first position to the second position. In one embodiment, the motive source includes: an electric input. In another embodiment, the motive source includes: an hydraulic input.

In one embodiment the adjuster of the vehicle suspension damper that includes the rotatable valve and the motive source includes a control rod coupled with the motive source and the rotatable valve, wherein the control rod rotationally responds to the input of motive source by rotating the rotatable valve according to the input.

In one embodiment, the vehicle suspension damper that includes the cylinder, the piston assembly, and the adjuster, further includes at least one vented path there through, wherein the fluid flows through the at least one vented path when the fluid moves from the first side of the damping piston to the second side of the damping piston, and further includes at least one set of shims coupled to the at least one vented path, wherein the at least one set of shims obstructs the at least one vented path during at least one of compression and rebound of the vehicle suspension damper.

In one embodiment, the vehicle suspension damper that includes the cylinder, the piston assembly, and the adjuster, further includes a shaft positioned within the cylinder, the shaft including at least one window through which the fluid flows from the first side of the damping piston to the second side of the damping piston, and further includes a needle valve positioned with the cylinder, whereupon in response to an excursion out of a bore or incursion into the bore of the needle valve during a rebound or compression, respectively, of the vehicle suspension damper, the at least one window of the shaft opens or closes, respectively, thereby changing a flow of the fluid through the shaft from the first side of the damping piston to the second side of the damping piston.

One embodiment of the present technology includes a method for damping including: applying a compression to a damping fluid, forcing at least a first portion of the compressed damping fluid through an adjustable flow regulator, and delivering regulated damping fluid into pressure communication with a gas charge. In one embodiment, the method further includes, in response to positioning input, positioning the adjustable flow regulator into at least one of a first position and a second position such that the at least a first portion of the compressed damping fluid is enabled to flow through the adjustable flow regulator.

In one embodiment, the forcing of the at least a first portion of the compressed damping fluid through an adjustable flow regulator includes forcing the at least a first portion of compressed damping fluid through at least one passageway of a rotatable valve of the adjustable flow regulator, wherein the rotatable valve is in a fully open position. In one embodiment, the positioning includes, in response to the positioning input, rotating a rotatable valve to the at least one of the first position and the second position, wherein the rotatable valve comprises at least one passageway through which the at least a first portion of the compressed damping fluid is forced.

In another embodiment, the forcing of the at least a first portion of the compressed damping fluid through an adjustable flow regulator includes forcing at least a first portion of the compressed damping fluid through at least one passageway of a rotatable valve of the adjustable flow regulator, wherein the rotatable valve is configured for rotating from a first position to a second position and the rotatable valve is in a partially open position.

In one embodiment, the method further includes obstructing a flow of at least a second portion of the compressed damping fluid through the adjustable flow regulator, wherein the adjustable flow regulator comprises a rotatable valve configured for rotating from a first position to a second position, the rotatable valve including at least one passageway there through, wherein when the rotatable valve is in at least one of the first position and the second position, the flow of the at least the second portion of the compressed damping fluid is obstructed in its flow through the at least one passageway.

In one embodiment, the method further includes forcing the at least first portion of compressed damping fluid through at least one set of shim stacks configured for at least partially obstructing a flow of compressed damping fluid.

In one embodiment, the method further includes forcing the at least first portion of the compressed damping fluid through at least one window of a shaft, wherein the shaft encompasses at least a portion of the adjustable flow regulator.

One embodiment of the present technology includes an adjustment system for adjusting a flow of fluid through a vehicle suspension damper. The adjustment system includes: a rotatable valve; a damping adjustment lever; and a control rod. The rotatable valve is configured for rotating from a first position to a second position. The rotatable valve includes at least one passageway there through, wherein upon a movement of the rotatable valve effects a change in the flow of the fluid through the vehicle suspension damper. The damping adjustment lever is configured for, upon movement, rotating the rotatable valve from the first position to the second position. The control rod is rotationally fixed to the damping adjustment lever and the rotatable valve, wherein the control rod rotationally responds to the movement of the damping adjustment lever by rotating the rotatable valve in proportion to the movement.

In one embodiment of the adjustment system, the adjustment system is coupled to a piston assembly positioned within a cylinder of the vehicle suspension damper, wherein the piston assembly compresses the fluid as the piston assembly moves within the cylinder.

In one embodiment of the adjustment system, the change that is effected is an obstruction of the flow of the fluid from a first side of a damping piston of the piston assembly to a second side of the damping piston. Further, in one embodiment, the damping piston includes at least one vented path there through and at least one set of shims. The fluid flows through the at least one vented path when the fluid moves from the first side of the damping piston to the second side of the damping piston. The at least one set of shims is coupled to the at least one vented path, wherein the at least one set of shims obstructs the at least one vented path during at least one of compression and rebound of the vehicle suspension damper.

In one embodiment, the adjustment system further includes: a shaft and a needle valve positioned within the cylinder. The shaft includes at least one window through which the fluid flows from the first side of the damping piston to the second side of the damping piston. In response to an excursion out of a bore of the needle valve or incursion into the bore during a rebound or compression, respectively, of the vehicle suspension damper, the at least one window of the shaft opens or closes, respectively, thereby changing a flow of the fluid through the shaft from the first side of the damping piston to the second side of the damping piston.

In one embodiment, the adjustment system further includes: a motive source coupled with the control rod. The motive source is configured for providing input, wherein in response to the input, the control rod rotationally responds to the input from the motive source by rotating the rotatable valve according to the input. In various embodiments, the input is electric and/or hydraulic.

BRIEF DESCRIPTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is applicable to alternative embodiments, modifications and equivalents, which may be included within the spirit and scope of the invention as defined by the appended claims.

Furthermore, in the following description of embodiments, numerous specific details are set forth in order to provide a thorough understanding of the present technology. However, the present technology may be practiced without these specific details. In other instances, well known methods, procedures, and components have not been described in detail as not to unnecessarily obscure aspects of the present disclosure.

Embodiments describe an adjustable vehicle suspension damper enabled to vary the damping rate. The adjustable vehicle suspension damper includes a piston of a piston assembly and an adjuster. The piston assembly compresses fluid moving through the vehicle suspension damper. The adjuster obstructs fluid flow moving from a first side of the piston to a second side of the piston.

The following discussion will first briefly describe various embodiments. The discussion then turns to a description of the FIGS. 1-17E and embodiments shown therein.

Integrated damper/spring vehicle shock absorbers often include a damper body surrounded by or used in conjunction with a mechanical spring or constructed in conjunction with an air spring or both. The damper often consists of a piston and shaft telescopically mounted in a fluid filled cylinder.

The damping fluid (i.e., damping liquid) or damping liquid may be, for example, hydraulic oil. A mechanical spring may be a helically wound spring that surrounds or is mounted in parallel with the damper body. Vehicle suspension systems typically include one or more dampers as well as one or more springs mounted to one or more vehicle axles. As used herein, the terms "down", "up", "downward", "upward", "lower", "upper", and other directional references are relative and are used for reference only.

FIG. 1A shows an asymmetric bicycle fork 100 having a damping leg and a spring leg, according to one example embodiment. The damping leg includes an upper tube 103 mounted in telescopic engagement with a lower leg tube 110 and having fluid damping components therein. The spring leg includes an upper tube 106 mounted in telescopic engagement with a lower leg tube 111 and having spring components therein. The upper tubes 103, 106 may be held centralized within the lower legs tubes 110, 111 by an annular bushing 108. The fork 100 may be included as a component of a bicycle such as a mountain bicycle or an off-road vehicle such as an off-road motorcycle. In some embodiments, the fork 100 may be an "upside down" or Motocross-style motorcycle fork.

In one embodiment, the damping components inside the damping leg include an internal piston 166 disposed at an upper end of a damper shaft 136 and fixed relative thereto. The internal piston 166 is mounted in telescopic engagement with a cartridge tube 162 connected to a top cap 180 fixed at one end of the upper tube 103. The interior volume of the damping leg may be filled with a damping liquid such as hydraulic oil. The piston 166 may include shim stacks (i.e., valve members) that allow a damping liquid to flow through vented paths in the piston 166 when the upper tube 103 is moved relative to the lower leg tube 110. A compression chamber is formed on one side of the piston 166 and a rebound chamber is formed on the other side of the piston 166. The pressure built up in either the compression chamber or the rebound chamber during a compression stroke or a rebound stroke provides a damping force that opposes the motion of the fork 100.

The spring components inside the spring leg include a helically wound spring 115 contained within the upper tube 106 and axially restrained between top cap 181 and a flange 165. The flange 165 is disposed at an upper end of the riser tube 163 and fixed thereto. The lower end of the riser tube 163 is connected to the lower leg tube 111 in the spring leg and fixed relative thereto. A valve plate 155 is positioned within the upper leg tube 106 and axially fixed thereto such that the valve plate 155 moves with the upper tube 106. The valve plate 155 is annular in configuration, surrounds an exterior surface of the riser tube 163, and is axially moveable in relation thereto. The valve plate 155 is sealed against an interior surface of the upper tube 106 and an exterior surface of the riser tube 163. A substantially incompressible lubricant (e.g., oil) may be contained within a portion of the lower leg tube 111 filling a portion of the volume within the lower leg tube 111 below the valve plate 155. The remainder of the volume in the lower leg tube 111 may be filled with gas at atmospheric pressure.

During compression of fork 100, the gas in the interior volume of the lower leg tube 111 is compressed between the valve plate 155 and the upper surface of the lubricant as the upper tube 106 telescopically extends into the lower leg tube 111. The helically wound spring 115 is compressed between the top cap 181 and the flange 165, fixed relative to the lower leg tube 111. The volume of the gas in the lower leg tube 111 decreases in a nonlinear fashion as the valve plate 155, fixed relative to the upper tube 106, moves into the lower leg tube 111. As the volume of the gas gets small, a rapid build-up in pressure occurs that opposes further travel of the fork 100. The high pressure gas greatly augments the spring force of spring 115 proximate to the "bottom-out" position where the fork 100 is fully compressed. The level of the incompressible lubricant may be set to a point in the lower leg tube 111 such that the distance between the valve plate 155 and the level of the oil is substantially equal to a maximum desired travel of the fork 100.

Figure 1B:
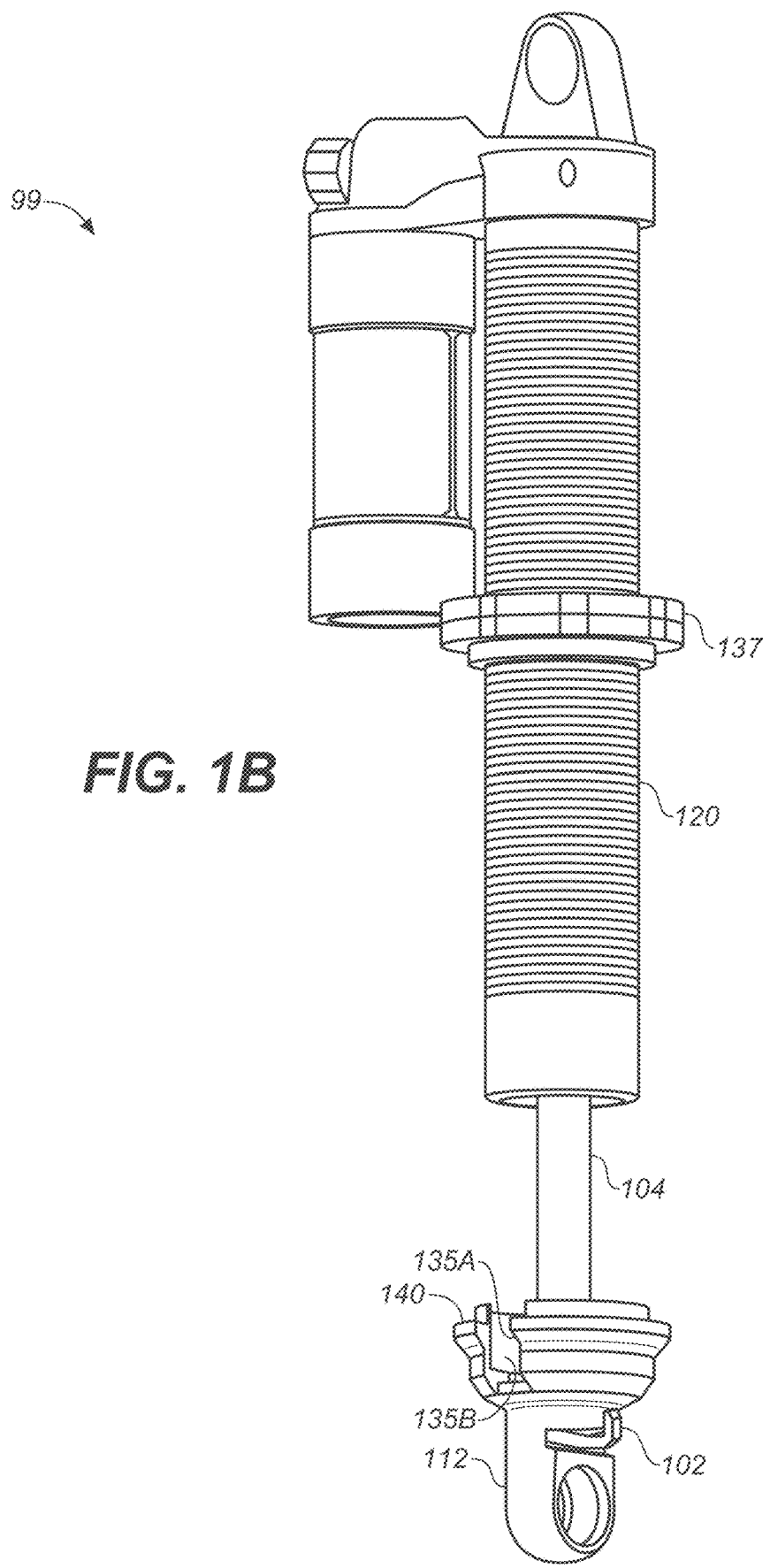
FIG. 1B depicts a shock absorber assembly including an internal bypass damper, in accordance with an embodiment.

Referring now to FIG. 1B, a sectional view of a shock absorber assembly 99 is depicted, in accordance with an embodiment. The shock absorber assembly 99 includes an internal bypass damper. The shock absorber assembly 99 includes a threaded body 120 (having an adjustable threaded spring 137 support thereon), a piston rod or shaft 104, a lower eyelet assembly including a lower spring support 140 and a damping adjustment lever 102. Another type of internal bypass damper is shown and described in U.S. Pat. No. 6,296,092 ('092 Patent), which is entirely incorporated herein by reference.

Figure 2:
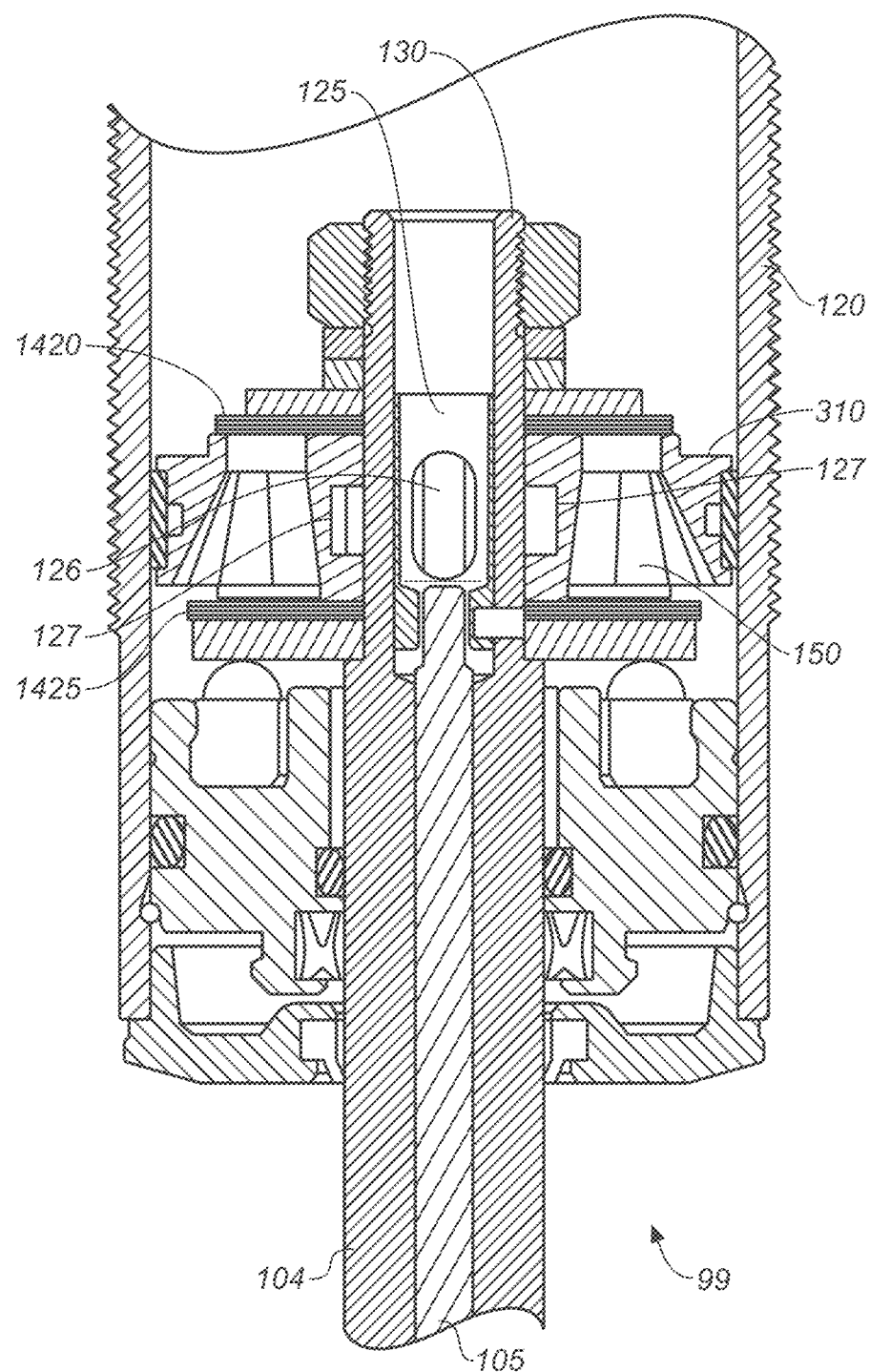
FIG. 2 depicts a cross-sectional side elevation view of a shock absorber assembly, in accordance with an embodiment.
Figure 4:
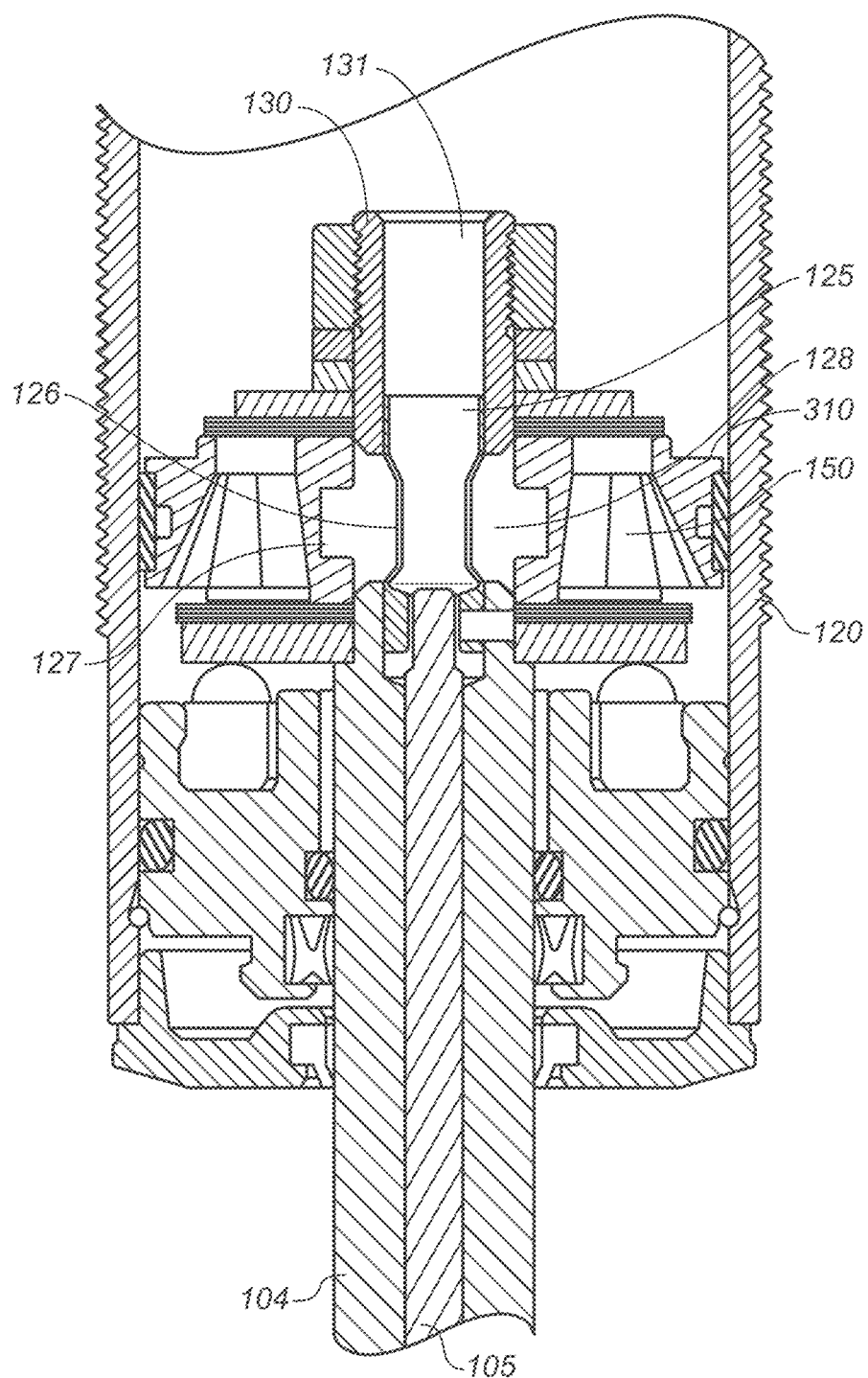
FIG. 4 depicts a cross-sectional side elevation view of a shock absorber assembly, in accordance with an embodiment.

FIG. 2 and FIG. 4 depict a cross-sectional view of a shock absorber assembly 99, in accordance with an embodiment. As shown, a damping piston 310 is connected to an end of the shaft 104. The interior of the shaft 104 includes a control rod 105 which, when rotated, correspondingly rotates valve 125 and its passageways 126. Note that in the view of FIG. 2, the passageways 126 are aligned with an axis perpendicular to the page and in FIG. 4, the passageways 126 are aligned with the plane of the page. Further, in FIG. 2 the passageways 126 (or apertures) are aligned with a solid portion of the wall of the valve recess 130, and as such the interior 131 of the shaft 104/valve recess 130 is closed from fluid communication with annular flow distributor 127. In FIG. 4, the passageways 126 are aligned with the shaft windows 128 (note that the shaft 104/valve recess 130 is analogous to the shaft 205 of FIG. 13F having the windows or flow ports), thereby allowing fluid flow between the interior 131 of the shaft 104 and the annular flow distributor 127.

Figure 3:
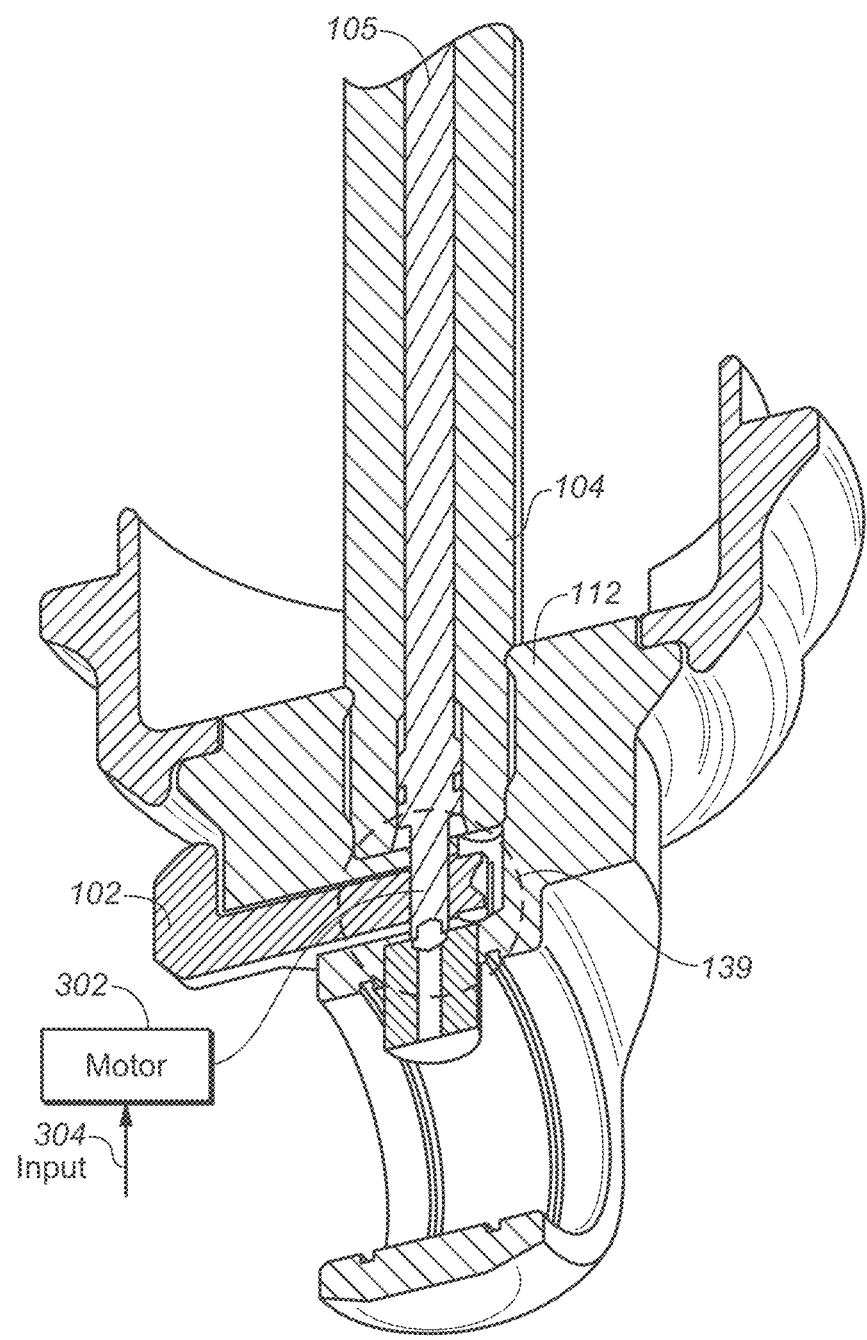
FIG. 3 depicts a cross-sectional view of an eyelet assembly as attached at an end of a shaft, in accordance with an embodiment.

FIG. 3 depicts a cross-sectional view of an eyelet assembly 112 as attached at an end of the shaft 104 (opposite the damping piston 310), including a damping adjustment lever 102 rotationally fixed to an end of the control rod 105, in accordance with an embodiment. When the damping adjustment lever 102 is rotated about the long axis of the control rod 105, the control rod 105 is correspondingly rotated, which in turn rotates valve 125 and passageways 126. Note that in lieu of or in addition to the damping adjustment lever 102, a motor or other suitable motive device (labeled "motor 302") may be attached to control rod 105 to provide rotation of the control rod 105 in response to input 302, such as electric, hydraulic (pneumatic) or other suitable input 304.

Figure 5:
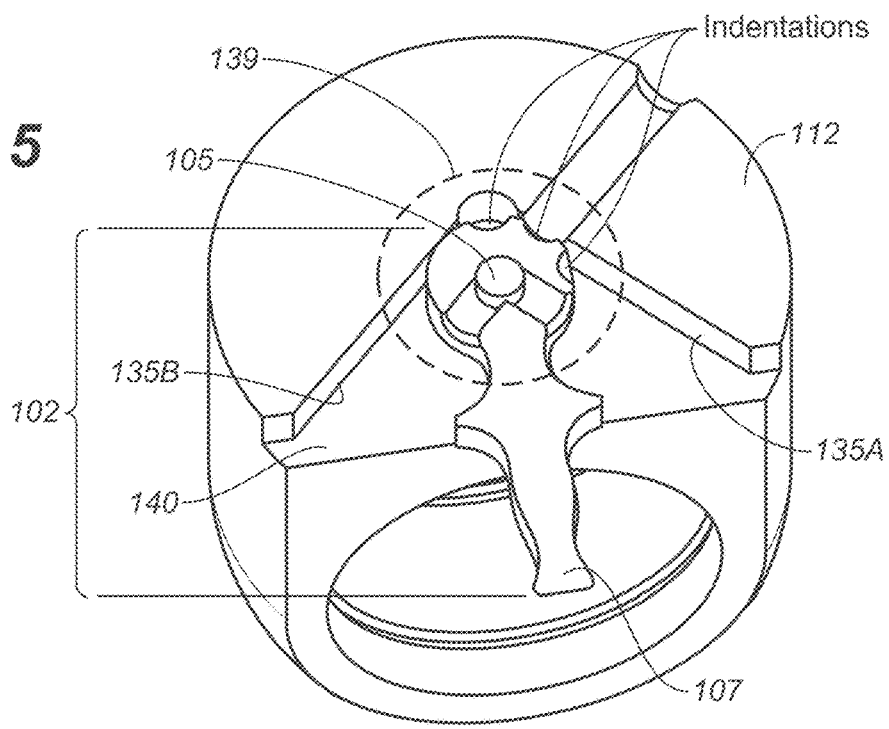
FIG. 5 depicts a perspective view of an eyelet assembly exposing a connection between a damping adjustment lever and a rod, as well as rotational travel limits for the damping adjustment lever that includes the walls of the lever slot, in accordance with an embodiment.

FIG. 5 depicts a cross-sectional view of the eyelet assembly 112 that exposes a connection between the damping adjustment lever 102 and the control rod 105, as well as rotational travel limits for the damping adjustment lever 102, that includes the walls 135A and 135B (hereinafter, "walls 135") of the damping adjustment lever slot 140, in accordance with an embodiment.

Figure 6:
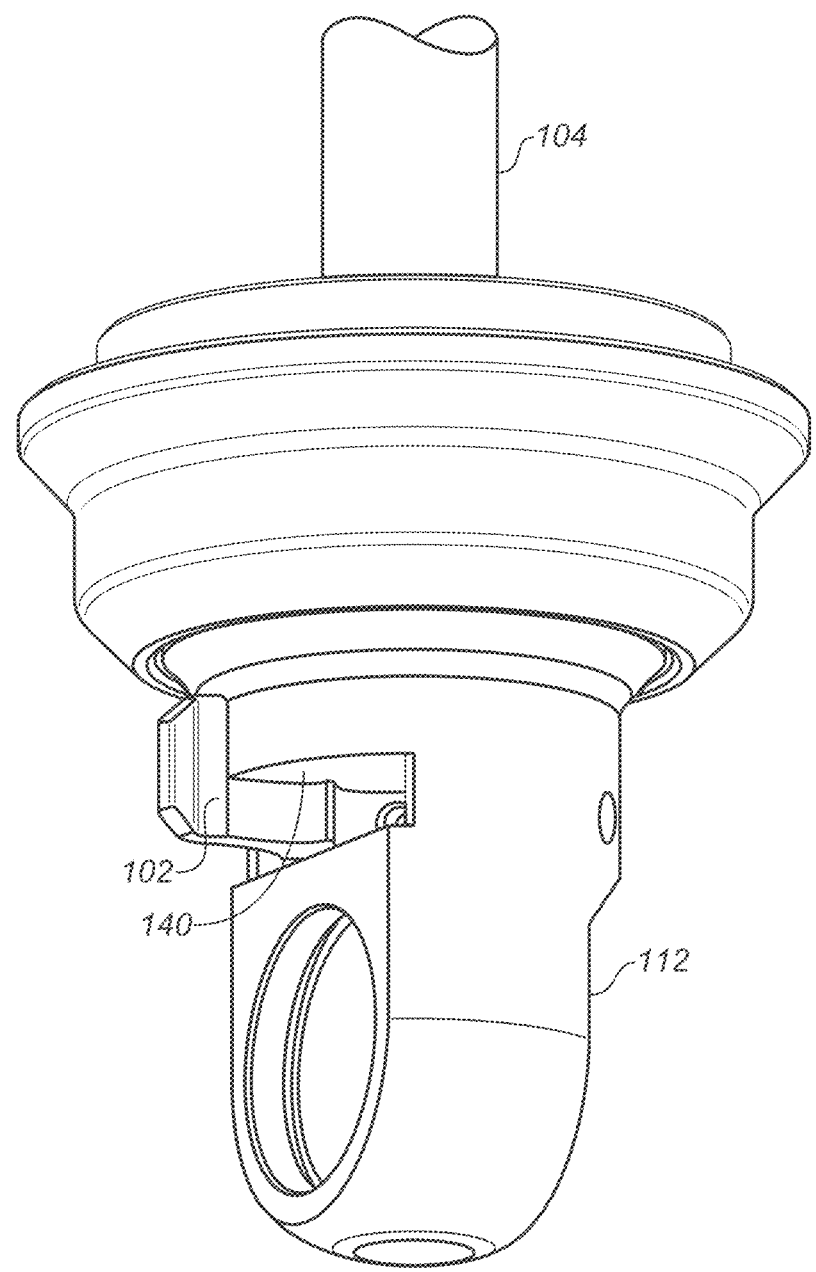
FIG. 6 depicts a perspective view of the eyelet assembly showing the damping adjustment lever within the lever slot, in accordance with an embodiment.

FIG. 6 depicts a cross-sectional view of the eyelet assembly 112 showing the damping adjustment lever 102 within the damping adjustment lever slot 140, in accordance with an embodiment.

Figure 7:
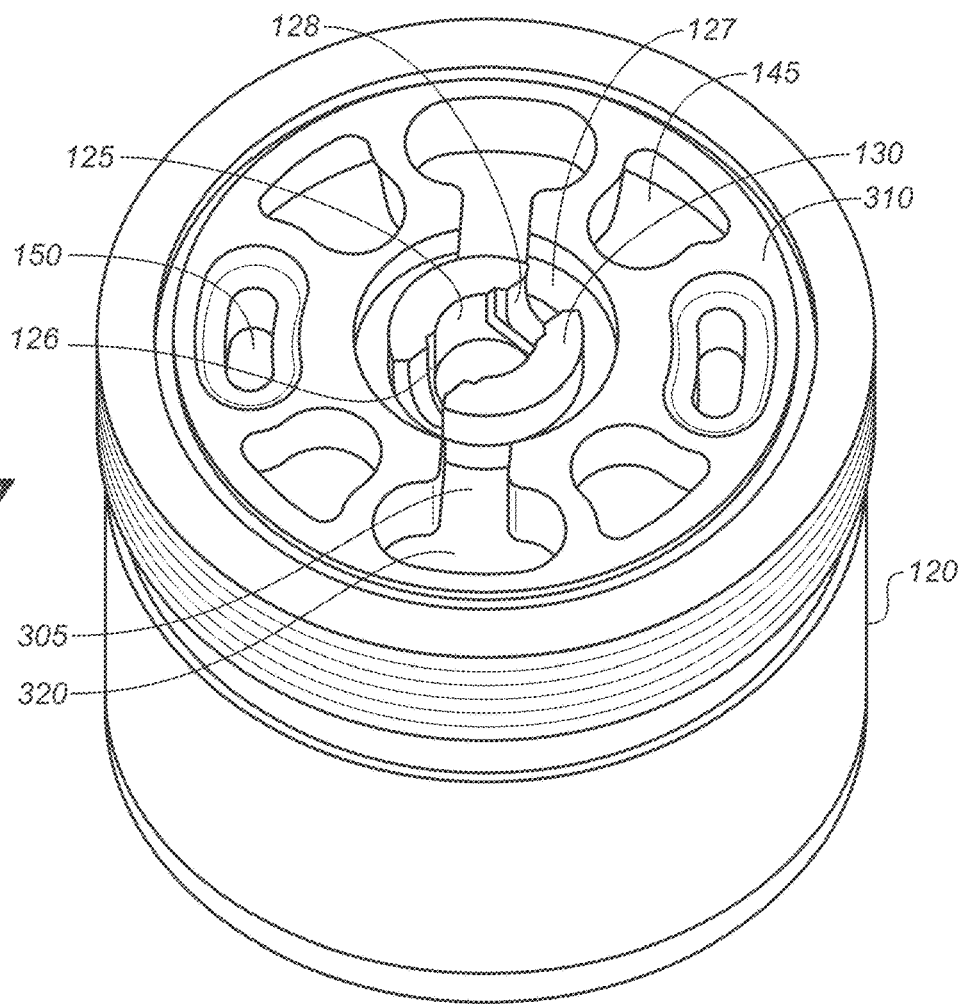
FIG. 7 depicts a perspective view of the damping piston, in accordance with an embodiment.

FIG. 7 depicts a cross-sectional view of the damping piston 310. As shown, the damping piston 310 is mounted to the valve recess 130 (the shaft 104 includes the valve recess 130; the valve recess 130 is at the upper portion of the shaft 104), having windows 128. Inside the valve recess 130 (and ultimately, inside the shaft 104) and coaxial therewith is shown valve 125 with passageways 126 (which serve as flow paths). The damping piston 310 includes typical compression and rebound ports (e.g., compression port 145 and rebound port 150) (shims not shown), and also bypass ports 320 in fluid communication with corresponding flow channels 305 and annular flow distributor 127.

Figure 8:
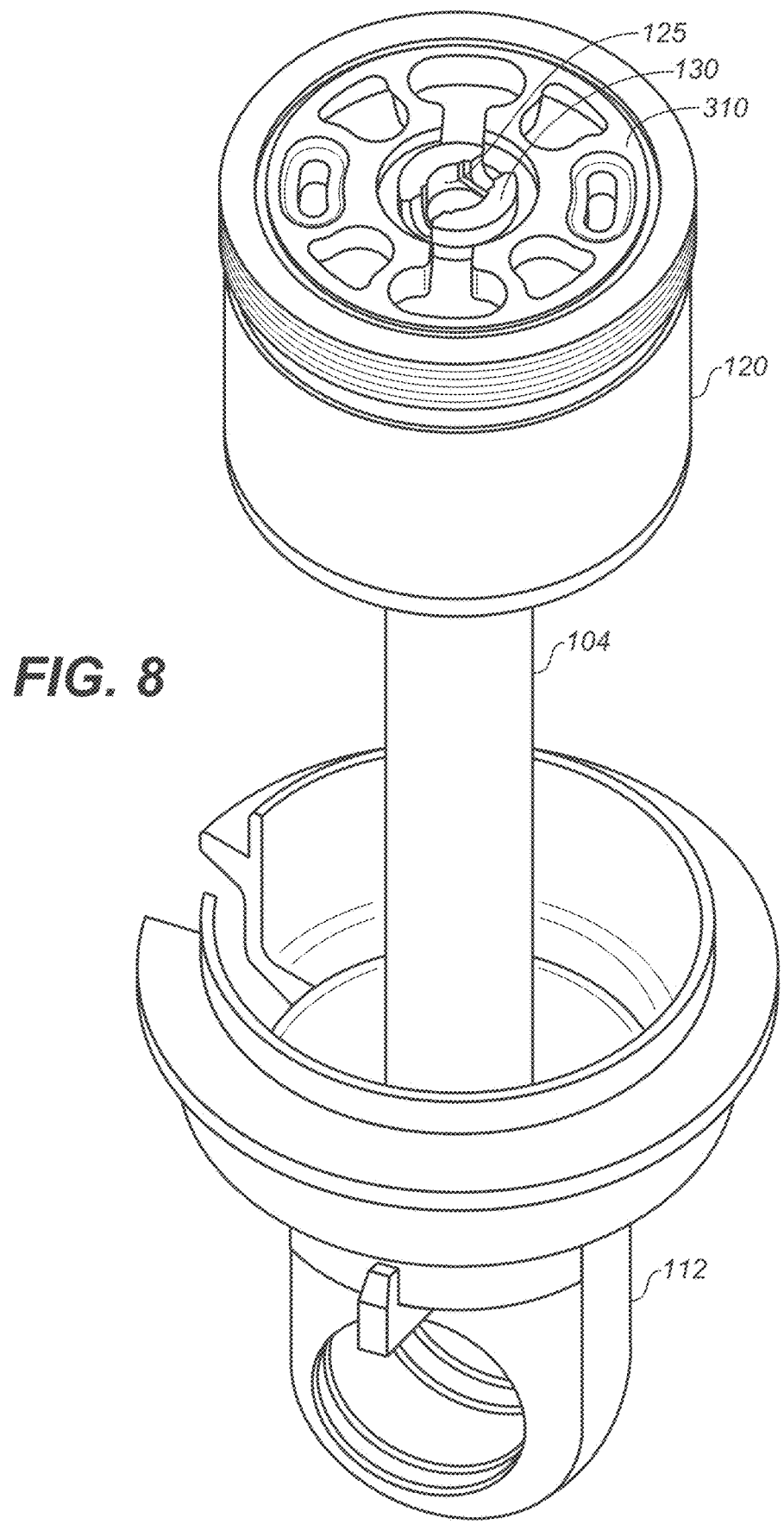
FIG. 8 depicts a perspective view of the damping piston of FIG. 7 as related to the eyelet assembly of FIG. 3, in accordance with an embodiment.

FIG. 8 depicts the damping piston 310 of FIG. 7 as related to the eyelet assembly 112 of FIG. 3 (and FIG. 6), in accordance with an embodiment.

Figure 9:
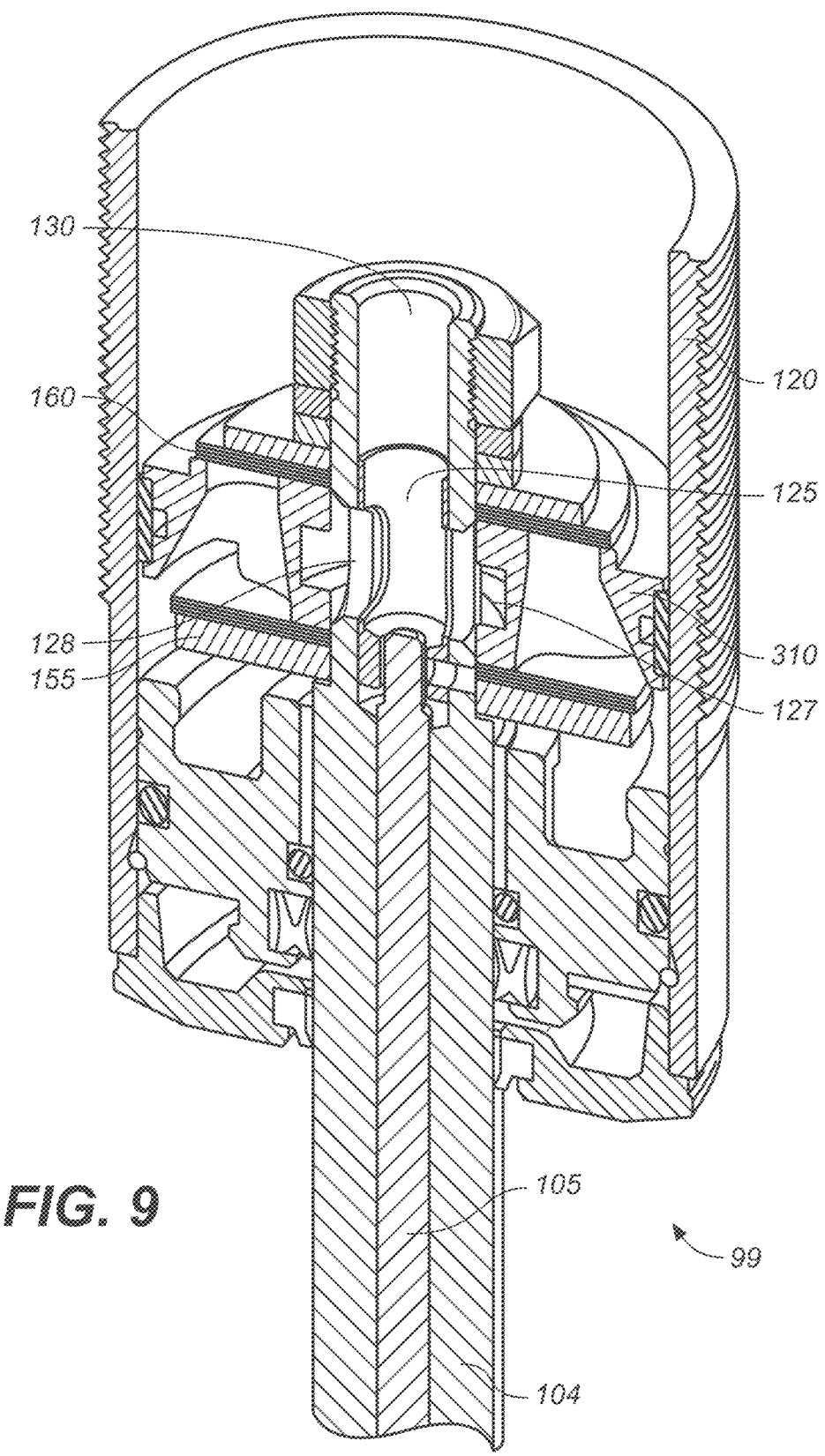
FIG. 9 depicts a cross-sectional top side elevation view of a shock absorber assembly, in accordance with an embodiment.

FIG. 9 depicts a cross-sectional view of a shock absorber assembly 99, in accordance with an embodiment. FIG. 9 is an additional view showing a configuration, as in FIG. 4, where passageways 126 are aligned with windows 128, and thereby allowing fluid communication from the interior 131 of the shaft 104 to the annular flow distributor 127 and correspondingly to (referring to FIG. 7) flow channels 305 and bypass ports 320.

Figures 10, 11:
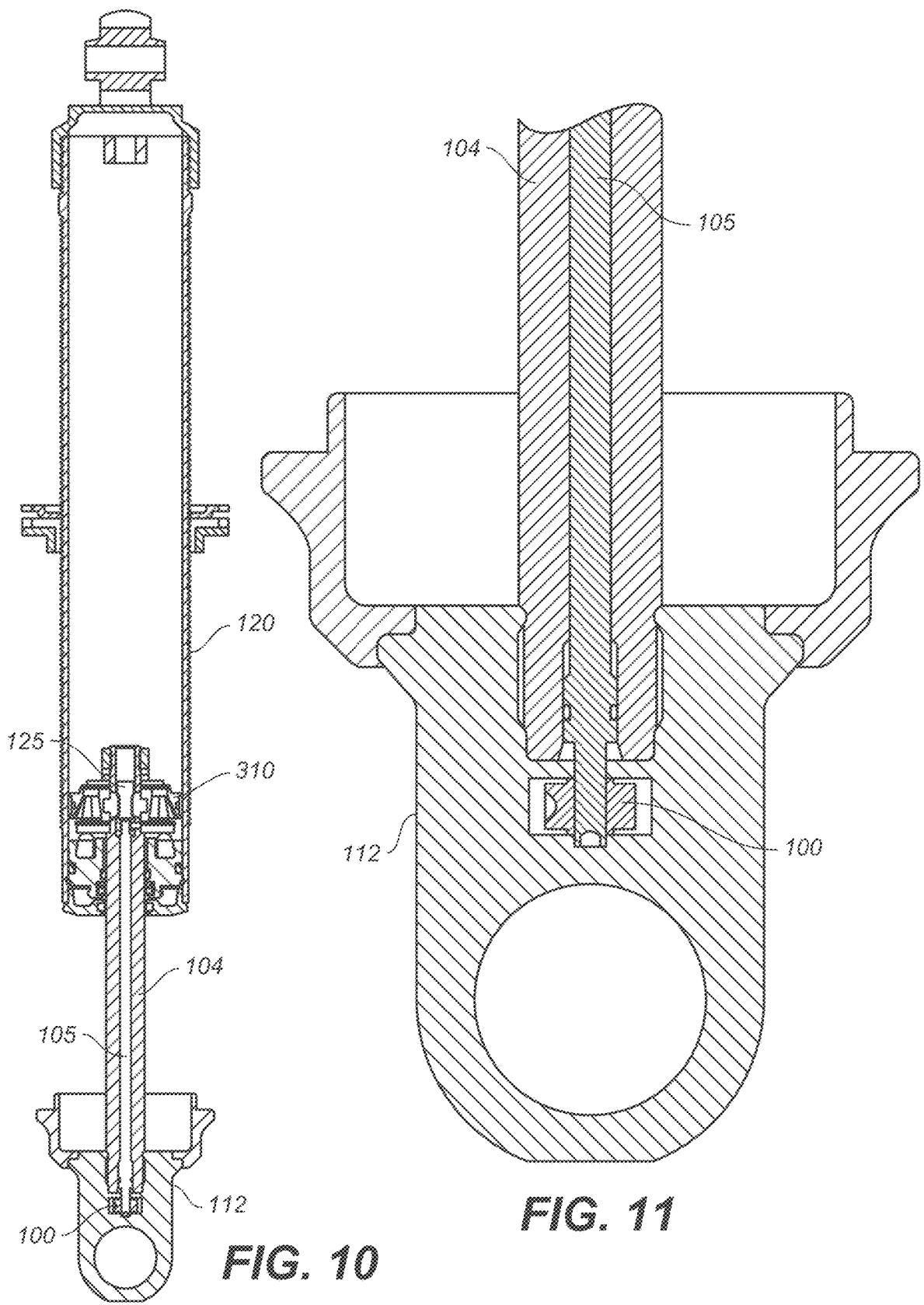
FIG. 10 depicts a perspective view of a shock absorber assembly, with a portion of the shock absorber assembly shown in a cross-sectional side elevation view, illustrating the related mechanisms therein, in accordance with an embodiment.
FIG. 11 depicts a perspective view of a lower eyelet assembly, with a portion of the lower eyelet assembly shown in a cross-sectional side elevation view, in accordance with an embodiment.

FIG. 10 depicts a partial cross-sectional view of the shock absorber assembly 99, illustrating the related mechanisms therein, in accordance with an embodiment.

FIG. 11 depicts the a cross-sectional view of a lower portion of the eyelet assembly 112, in which the lower portion of the eyelet assembly 112 includes the damping adjustment lever 102 and its connection to the control rod 105.

Figure 12:
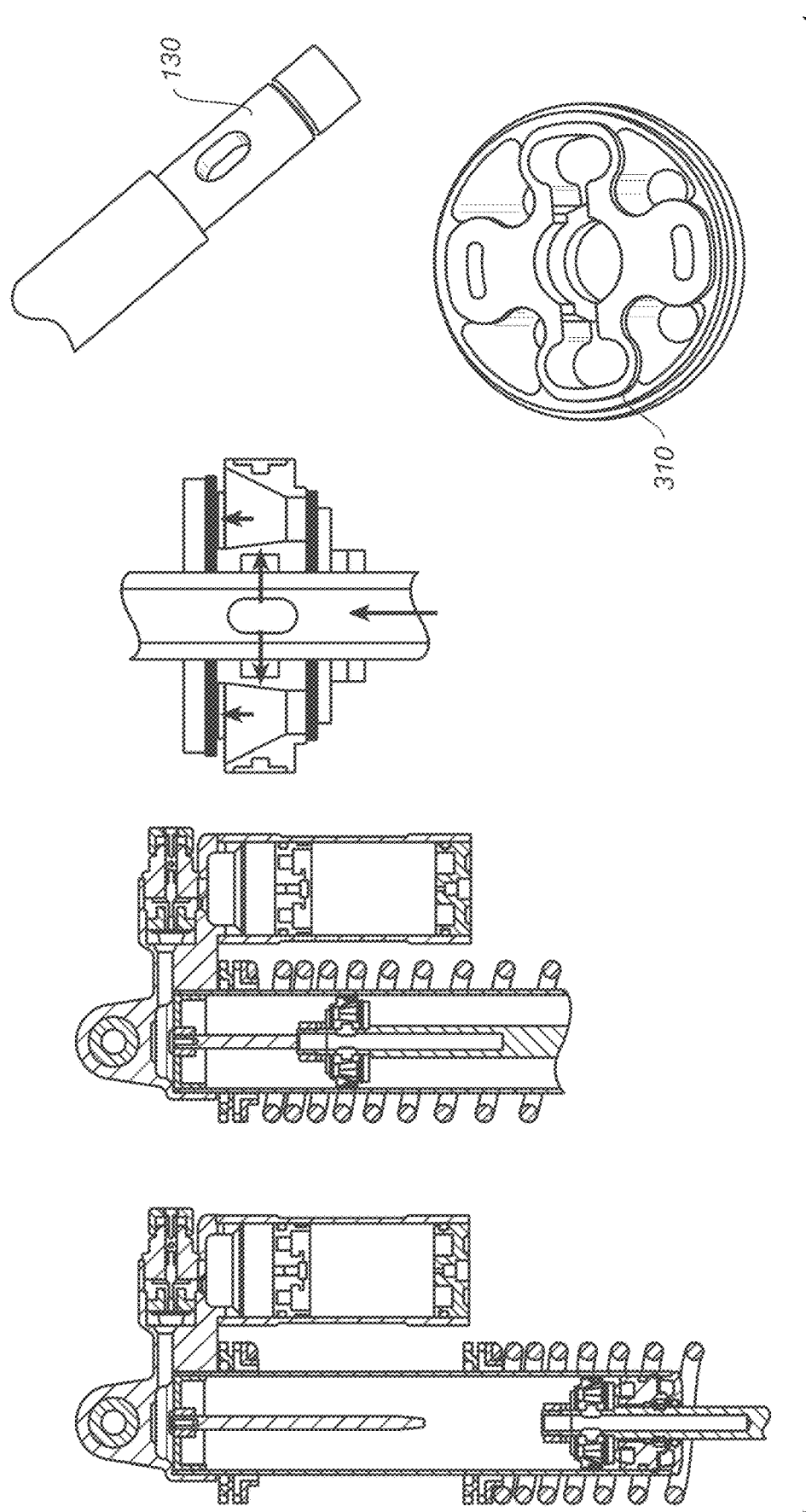
FIG. 12 depicts the windows, such as windows 128 (of FIG. 4) and 300 (of FIGS. 13A-13K and FIGS. 17A-17E), being opened or closed by the respective excursion or incursion of a needle during rebound or compression of the shock absorber assembly, in accordance with an embodiment.

FIG. 12 depicts the windows, such as windows 128 (see FIG. 4) and windows 128 (and flowports 305) (see FIG. 7), being opened or closed by the respective excursion or incursion of a needle during rebound or compression of the shock absorber assembly 99, respectively, in accordance with an embodiment. Note that in addition to the control feature described herein via control rod 105 and valve 125, a needle may also be employed to provide a position sensitive feature.

In one embodiment, and referring to FIG. 3, the damping adjustment lever 102 includes a handle 107 and an indexing mechanism 139 that retains the handle 107 in intermediate positions between the walls 135 of the damping adjustment lever slot 140, thereby providing "modal" damping adjustment selection. For example, the damping adjustment lever 102 may have three "click in" positions corresponding to three desired damping stiffness's resulting from three rotational positions of valve 125 (via control rod 105 and damping adjustment lever 102). In one embodiment, the motor 302 is an encoder and is capable of rotating the valve 125 to an effectively infinite number of positions between valve 125 full open and valve 125 full closed. As such, the so equipped suspension (shock) may have a highly variable and selectable damping function that, for example, could be selected from based on terrain, or speed, or other relevant driving factors.

In one embodiment, the shock absorber assembly 99 hereof includes the adjustment feature provided by valve 125, as well as the position sensitive feature as provided by a needle valve. Such a shock absorber assembly would be stiffer with increased compression, but such stiffness would begin or baseline from a pre-selected base damping level. In one embodiment, a shock absorber 99 hereof further includes an adjustable rebound shim preload 160 or other suitable rebound damping adjuster.

In one embodiment, the shock absorber assembly 99 herein may be used on the front, rear, or both, of a four wheeled vehicle and the "motor" is connected to a circuit having sensors for any or all of the vehicle roll, pitch, and yaw. The circuit further includes a programmable processor for receiving sensor data and signaling the appropriate motor or motors (e.g., one each at each of the four vehicle "corners") to either open or close the piston valve (e.g., valve 125) to correspondingly soften or stiffen the respective damping of the shock absorber assembly 99. One embodiment includes sensors for braking, accelerating, and/or turning. In one embodiment, the motors are controlled by a switch in the cockpit of the so equipped vehicle. In one embodiment, the switch or switches operate a circuit which supplies power to the motor or motors. In one embodiment, the switch is wireless and sends a signal to a circuit which supplies power to the "motor". In one embodiment, the switch is a personal computing device such as one including a cell phone (e.g., Apple iPhone™ or Android™ device). Other suitable motor control mechanisms may be employed.

The discussion now turns to FIGS. 13A-13K, FIGS. 14A-14B, FIGS. 15A-15B, FIGS. 16A-16F, and FIGS. 17A-17E, which are excerpted from the U.S. Provisional Patent Application Ser. No. 61/491,858 (hereinafter, "'858"). Of note, any suitable combinations of features disclosed herein are contemplated, including combinations of the material from '858 and that disclosed herein.

Of additional note, U.S. Pat. No. 7,628,259, which Patent is entirely incorporated herein by reference, describes some forms of compression cavitations that may occur in a damper. Needle type variable dampers are shown in U.S. Pat. Nos. 5,810,128; and 6,446,771, each of which is entirely incorporated herein by reference. An internal bypass damper is shown and described in U.S. Pat. No. 6,296,092 (hereinafter, "'092 Patent") which is entirely incorporated herein by reference. For enhanced illustration, parts as numbered herein may be (but not necessarily) analogous with numbered parts of the '092 Patent.

Figure 13A:
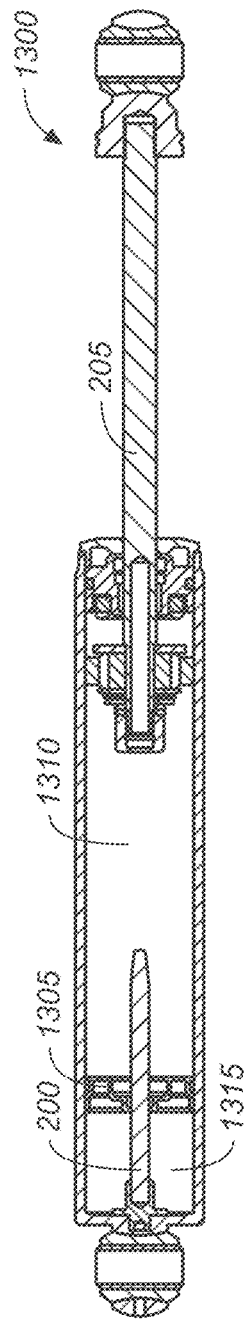
FIGS. 13A-13E depict a cross-sectional side elevation views of a needle type monotube damper in various stages of movement sequentially from an extended length to a compressed position, in accordance with embodiments.
Figure 13B:
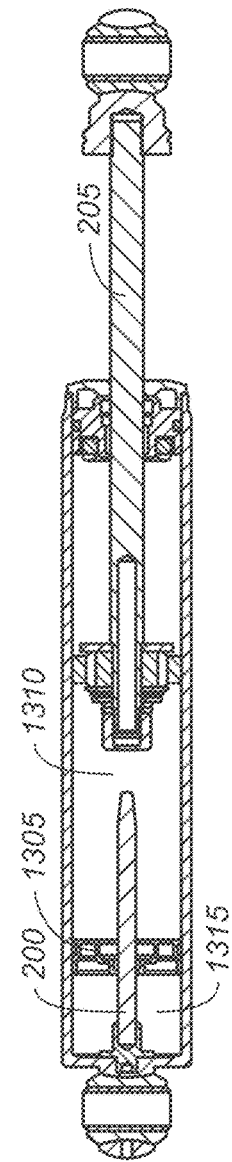
Figure 13C:
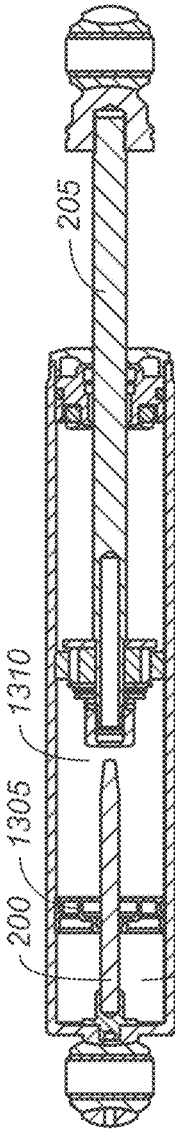
Figure 13D:
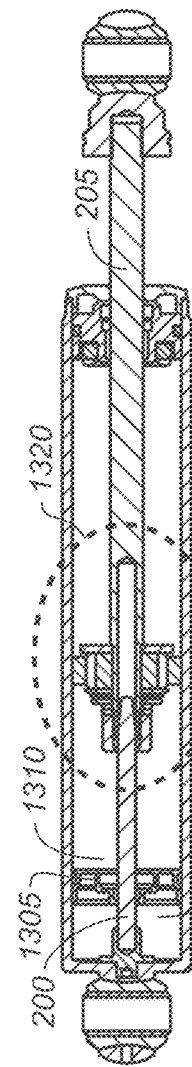

FIGS. 13A-13K depict a needle type monotube damper 1300 in various stages of movement sequentially from an extended length to a compressed position. Referring now to FIG. 13A, the needle type monotube damper 1300 includes an internal floating piston 1305 mounted substantially co-axially around the needle 200 and axial movable relative thereto. Also shown is a reference to the damping liquid 1310 and the gas charge 1315. FIG. 13A depicts the needle type monotube damper 1300 at its extended length. FIG. 13B depicts the needle type monotube damper 1300 in a more compressed state than that of the needle type monotube damper 1300 of FIG. 13A (also referred to as the curb height). FIG. 13C depicts the needle type monotube damper 1300 in a more compressed state than that of the needle type monotube damper 1300 of FIG. 13B (also referred to as the roll zone). FIG. 13D depicts the needle type monotube damper 1300 in a more compressed state than that of the needle type monotube damper 1300 of FIG. 13C. As shown, the needle 200 enters a bore of shaft 205 beginning just before the "bottom-out zone". ("Bottom out" is a point of maximum practical leg compression.)

Figure 13E:
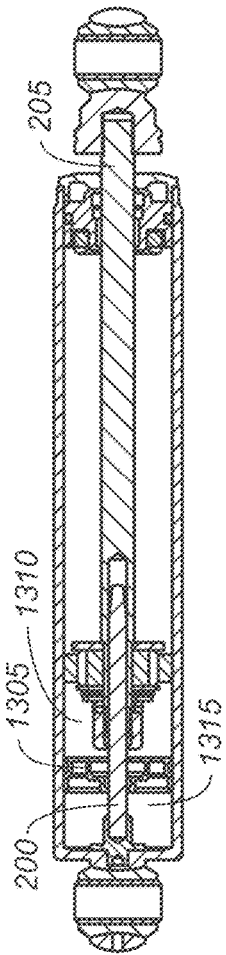
Figure 13F:
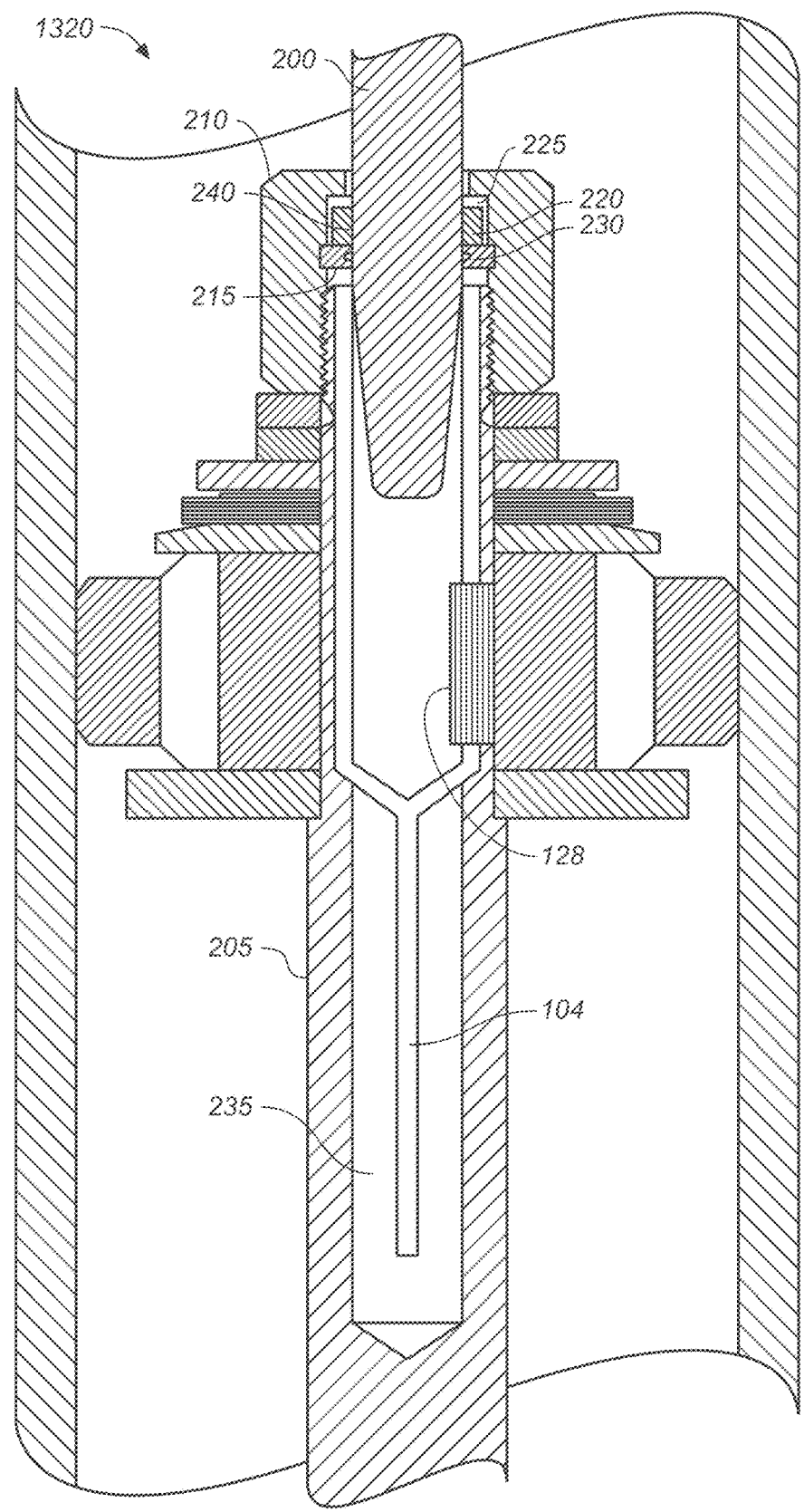
FIG. 13F depicts an enlarged cross-section side elevation view of a portion of the needle type monotube damper of FIG. 13D, in accordance with an embodiment.

FIG. 13F depicts the detail 1320 of FIG. 13D, showing the needle 200 and the shaft 205 at approximately the bottom-out zone position, in accordance with an embodiment. As shown in FIG. 13F, the needle 200 is surrounded by the check valve 220 contained with the nut 210 fixed on the end of the shaft 205. During the compression movement within the "bottom out" zone, the check valve 220 is moved, by fluid pressure within the bore 235 and flow of fluid out of the bore 235, upward against the seat 225 of nut 210 and the bulk of escaping fluid must flow through the annular clearance 240 that dictates a rate at which the needle 200 may further progress into the bore 235, thereby substantially increasing the damping rate of the damping unit 201 proximate to the "bottom-out" zone. The amount of annular clearance 240 between the exterior surface of the needle 200 and the interior surface of the check valve 220 determines the additional damping rate within the "bottom-out" zone caused by the needle 200 entering the bore 235. In one embodiment, the needle 200 is tapered to allow easier entrance of the needle 200 into the bore 235 through the check valve 220 upon rapid compression.

FIG. 13E depicts the needle type monotube damper 1300 in a more compressed state than that of the needle type monotube damper 1300 of FIG. 13D, such that the needle type monotube damper 1300 is in a compressed state.

During rebound (and hence, extension) within the "bottom-out" zone, fluid pressure in the bore 235 drops as the needle 200 is retracted and fluid flows into the bore 235, causing the check valve 220 to move toward a valve retainer clip 215 that secures the check valve 220 within the nut 210. In one embodiment, the check valve 220 is castellated or slotted 230 on the face of the check valve 220 adjacent to the valve retainer clip 215 to prevent sealing the check valve 220 against the valve retainer clip 215, thereby forcing all fluid to flow back into the bore 235 via the annular clearance 240. Instead, the castellation or slot 230 allows ample fluid flow into the bore 235 during the rebound stroke to avoid increasing the damping rate during rebound within the "bottom out" zone. The movement during the extension causes the check valve 220 to separate from the seat 225, thereby allowing ample flow of fluid into the bore 235 during extension. The check valve 220 is radially retained with the nut 210 which has a valve recess having radial clearance between the interior surface of the valve recess and the exterior surface of the check valve 220, thereby allowing for eccentricity of the needle 200 relative to the shaft 205 without hampering relative functioning of the parts (without causing interference that could deform the components of the damping unit 201).

Figure 13G:
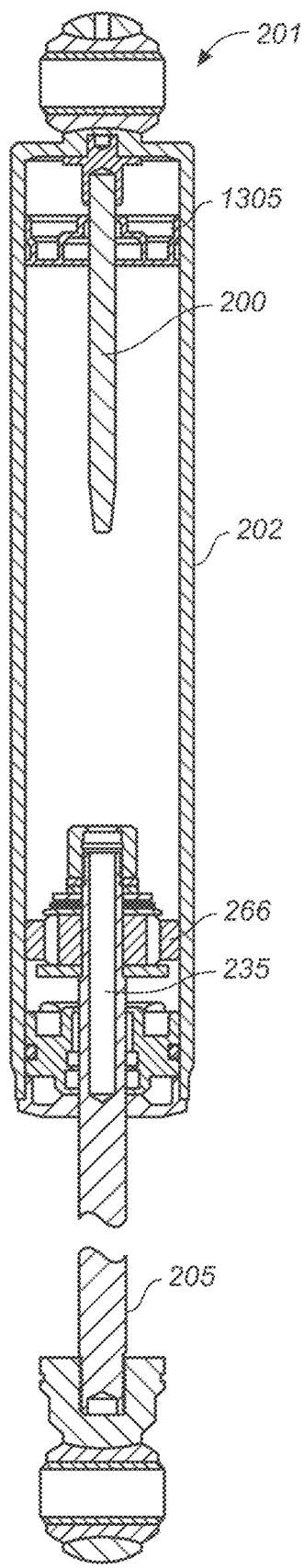
FIGS. 13G-13I depict cross-sectional side elevation views of a needle type monotube damper in various stages of movement sequentially from an extended length to a compressed position, in accordance with an embodiment.
Figure 13H:
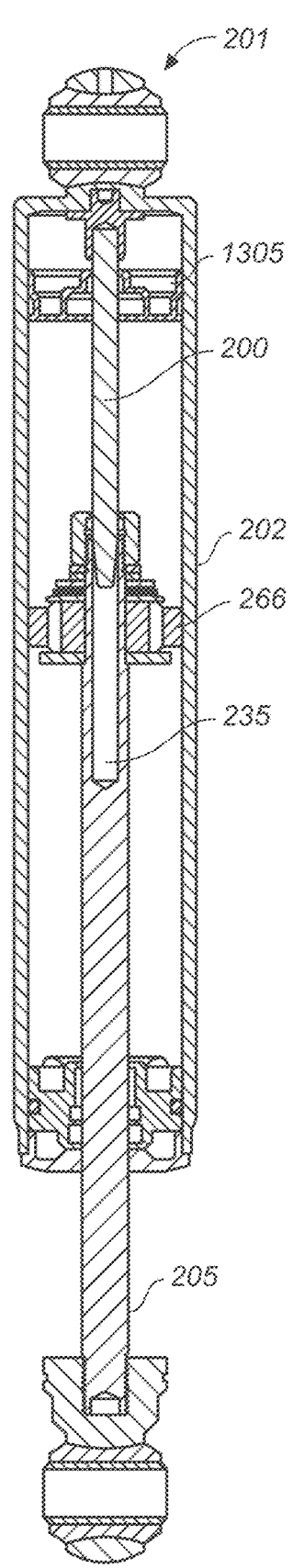
Figure 13I:
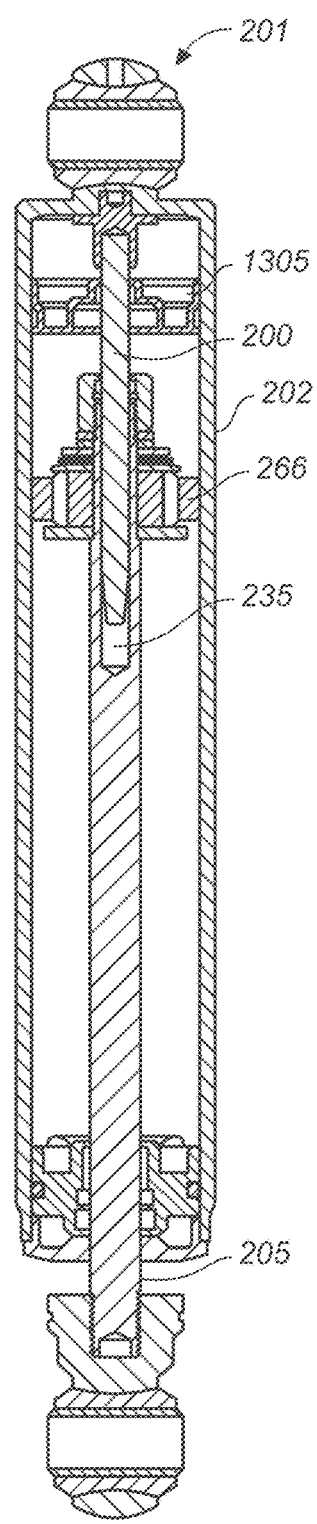

With reference now to FIG. 13G, FIG. 13H, and FIG. 13I, another example of a needle-type monotube damping unit in different states of compression is shown in cross-sectional side elevation views, in accordance with an embodiment.

In one embodiment, the components included in damping unit 201 may be implemented as one half of fork 100. In another embodiment, damping unit 201 may be implemented as a portion of a shock absorber that includes a helically-wound, mechanical spring mounted substantially coaxially with the damping unit 201. In yet other embodiments, damping unit 201 may be implemented as a component of a vehicle suspension system where a spring component is mounted substantially in parallel with the damping unit 201.

As shown in FIG. 13G, the damping unit 201 is positioned in a substantially fully extended position. The damping unit 201 includes a cylinder 202, a shaft 205, and a piston 266 fixed on one end of the shaft 205 and mounted telescopically within the cylinder 202. The outer diameter of piston 266 engages the inner diameter of cylinder 202. In one embodiment, the damping liquid (e.g., hydraulic oil or other viscous damping fluid) meters from one side to the other side of the piston 266 by passing through vented paths formed in the piston 266. Piston 266 may include shims (or shim stacks) to partially obstruct the vented paths in each direction (i.e., compression or rebound). By selecting shims having certain desired stiffness characteristics, the damping effects can be increased or decreased and damping rates can be different between the compression and rebound strokes of the piston 266. The damping unit 201 includes the internal floating piston 1305 (annular floating piston) mounted substantially co-axially around a needle 200 and axially movable relative thereto. The needle 200 is fixed on one end of the cylinder 202 opposite the shaft 205. A volume of gas is formed between the internal floating piston 1305 and the end of cylinder 202. The gas is compressed to compensate for motion of shaft 205 into the cylinder 202, which displaces a volume of damping liquid equal to the additional volume of the shaft 205 entering the cylinder 202.

During compression, the shaft 205 moves into the cylinder 202, causing the damping liquid to flow from one side of the piston 266 to the other side of the piston 266 within the cylinder 202. FIG. 13H shows the needle 200 and shaft 205 at an intermediate position as the damping unit 201 has just reached the "bottom-out" zone. In order to prevent the damping components from "bottoming out", potentially damaging said components, the damping force resisting further compression of the damping unit 201 is substantially increased within the "bottom-out" zone. The needle 200 (i.e., a valve member) compresses fluid in a bore 235, described in more detail in conjunction with FIG. 13F, thereby drastically increasing the damping force opposing further compression of the damping unit 201. Fluid passes out of the bore around the needle through a valve that is restricted significantly more than the vented paths through piston 266. As shown in FIG. 13I, the damping rate is increased substantially within the "bottom-out" zone until the damping unit 201 reaches a position where the damping unit 201 is substantially fully compressed.

Figure 13J:
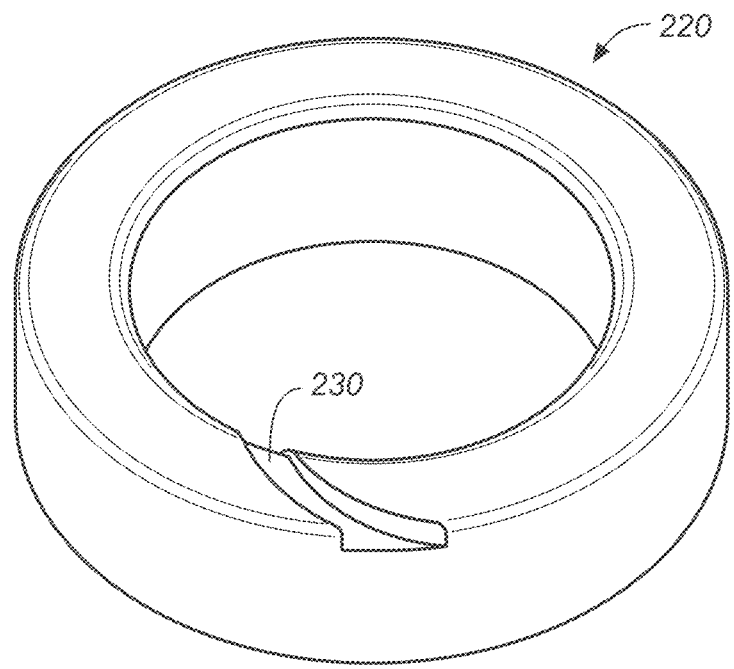
FIGS. 13J and 13K depict perspective views of the castellated (or slotted check valve), in accordance with an embodiment.
Figure 13K:
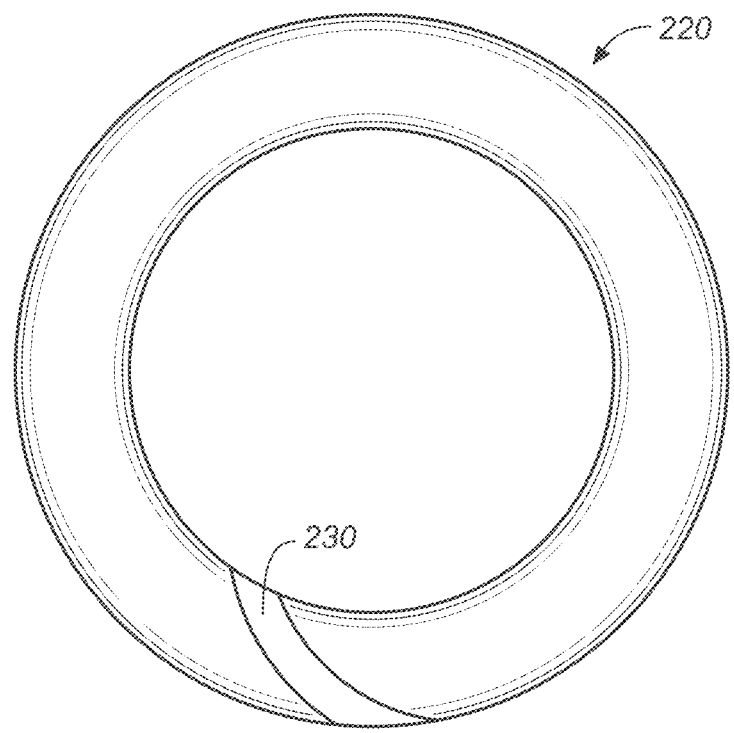

FIGS. 13J and 13K illustrate the castellated or slotted check valve 220, according to one example embodiment. As shown in FIGS. 13J and 13K, the check valve 220 is a washer or bushing having an interior diameter sized to have an annular clearance 240 between the interior surface of the check valve 220 and the exterior surface of the needle 200 when the needle 200 passes through the check valve 220. Different annular clearances 240 may be achieved by adjusting the interior diameter of the check valve 220 in comparison to the diameter of the needle 200, which causes a corresponding change in the damping rate proximate to the "bottom-out" zone. A spiral face groove is machined into one side of the check valve 220 to create the castellation or slot 230. It will be appreciated that the geometry of the slot 230 may be different in alternative embodiments and is not limited to the spiral design illustrated in FIGS. 13J and 13K. For example, the slot 230 may be straight (i.e., rectangular) instead of spiral, or the edges of the slot 230 may not be perpendicular to the face of the check valve 220. In other words, the geometry of the slot 230 creates empty space between the surface of the valve retainer clip 215 and the surface of the check valve 220 such that fluid may flow between the two surfaces.

When assembled, the check valve 220 is oriented such that the side with the slot 230 is proximate to the upper face of the valve retainer clip 215, thereby preventing the surface of the check valve 220 from creating a seal against the valve retainer clip 215. The slot 230 is configured to allow fluid to flow from the cylinder 202 to bore 235 around the exterior surface of the check valve 220, which has a larger clearance than the annular clearance 240 between the check valve 220 and the needle 200. In one embodiment, two or more slots 230 may be machined in the face of the check valve 220. In some embodiments, the check valve 220 is constructed from high-strength yellow brass (i.e., a manganese bronze alloy) that has good characteristics enabling low friction between the check valve 220 and the needle 200. In alternate embodiments, the check valve 220 may be constructed from other materials having suitable characteristics of strength or coefficients of friction.

FIGS. 14A-14B, FIGS. 15A-15B, FIGS. 16A-16F, and FIGS. 17A-17E show aspects of an embodiment having a "piggy back" reservoir (versus monotube). The damper of FIGS. 14A-17E includes a needle 200 and a shaft 205 having a bore 235 (the bore 235 being called out in FIG. 13F). During compression, the needle 200 enters the shaft 205 at some point (as previously described in reference to the monotube) and the compression damping rate correspondingly increases. In the embodiment of FIGS. 14A-17E, the mechanism is somewhat different from the previously described monotube, as will be discussed below.

FIG. 14A depicts a perspective view of the shock absorber assembly, in a compressing state, in accordance with embodiments. FIG. 14B depicts a cross-sectional side elevation view of the shock absorber assembly of FIG. 14A, in accordance with an embodiment, in which the damping unit 1400 is shown proximate to the "bottom out" zone where needle 200 has entered bore 235. Referring to FIGS. 14A and 14B, as well as FIGS. 15A-17E, the shaft 205 has a piston assembly 1405, including a damping piston 310, mounted thereon. The piston assembly 1405 has a top 1410 and a bottom 1415 as indicated, each having a corresponding damping valve "shim" stack for compression and rebound (extension) damping resistance, respectively (the compression damping valve shim stack 1425 and the rebound damping valve shim stack 1420). During a compression or rebound movement occurring when the needle 200 is not within the bore 235, damping fluid flow resistance is achieved via the appropriate shims and fluid also flows between the top 1410 and the bottom 1415 of the piston assembly 1405 through the bore 235 by way of shaft flow ports (including the compression port 145 and the rebound port 150 of FIG. 7) and piston flow channels 305. When the needle 200 just enters (or just leaves) the bore 235 (e.g., during compression or rebound, respectively), it impedes fluid flow through bore 235 (hence increasing the damping rate from freeflow) by virtue of its "plugging" effect. Fluid flow however may continue with the needle 200 in that position. When the full diameter of the needle 200 is adjacent the shaft flow ports, as shown in FIG. 14B, the needle 200 substantially blocks the shaft flow ports and hence substantially blocks flow through the flow channels 305 and bore 235. In one embodiment, such blockage effectively closes the bypass ports 320, thereby drastically reducing the available flow area through the damping piston 310.

FIG. 15A depicts a perspective view of aspects of embodiments, in an expanding state, in accordance with embodiments. FIG. 15A shows the reservoir flow adjuster valve 1505 for adjusting the flow of fluid into the reservoir 1510 of FIG. 15B. FIG. 15B depicts a cross-sectional view of FIG. 15A, aspects of embodiments having a "piggy back" reservoir (versus a monotube), in an expanding state, in accordance with embodiments. FIG. 15B shows an adjustable spring keeper 1515, a wound helical spring 1520, detail 1525 (an enlargement of detail 1525 is shown in FIG. 17D), detail 1530 (an enlargement of detail 1530 is shown in FIG. 17E), and bore 235.

As shown in FIG. 15B, damping unit 1400, shown fully extended, includes a cylinder 302 with a shaft 205 and a piston 310 fixed on one end of the shaft 205 and mounted telescopically within the cylinder 302. Damping unit 1400 also includes a needle 200 configured to enter a bore 235 in shaft 205. However, damping unit 1400 does not include an annular floating piston mounted substantially co-axially around the needle 200 and axially movable relative thereto. Instead, the piggy back reservoir 1510 includes a floating piston 1305 configured to perform the function described herein with regard to the internal floating piston. A volume of gas is formed between the internal floating piston 1305 and one end of the piggy back reservoir 1510. The gas is compressed to compensate for motion of shaft 205 into the cylinder 302. Excess damping liquid may enter or exit cylinder 302 from the piggy back reservoir 1510 as the volume of fluid changes due to ingress or egress of shaft 205 from the cylinder 302.

Figure 16A:
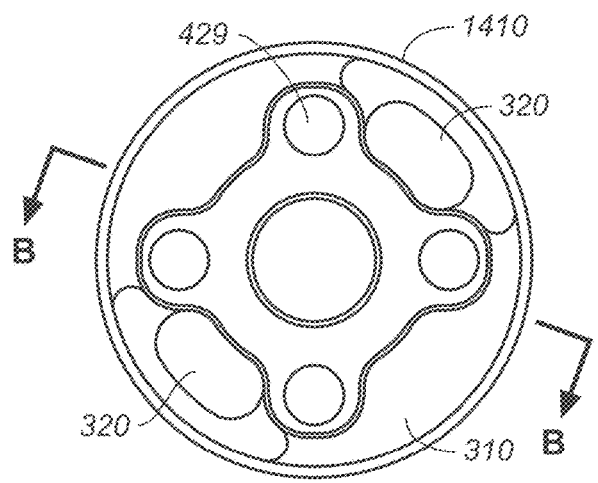
FIG. 16A depicts an enlarged cross-sectional top elevation view of the top 1410 of the piston assembly depicted in FIG. 14B, in accordance with an embodiment.

FIG. 16A depicts an enlarged cross-sectional top elevation view of the top 1410 of the piston assembly depicted in FIG. 14B, in accordance with an embodiment. FIG. 16C shows bypass ports 320.

Figure 16B:
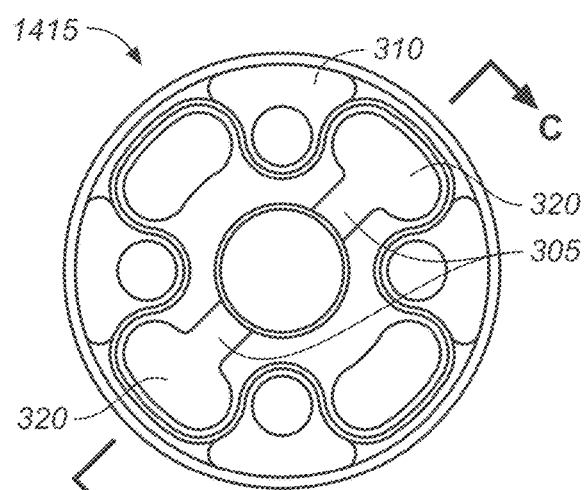
FIG. 16B depicts an enlarged cross-sectional top elevation view of the bottom 1415 of the piston assembly that is depicted in 14B, in accordance with an embodiment.
Figure 16C:
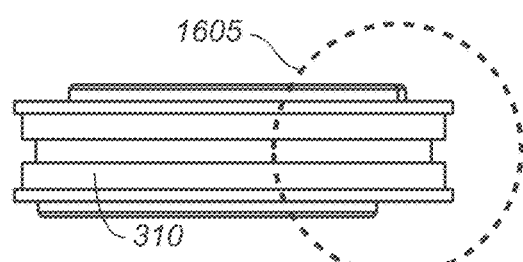
FIG. 16C depicts an enlarged perspective side view of the piston assembly, in accordance with an embodiment.
Figure 16D:
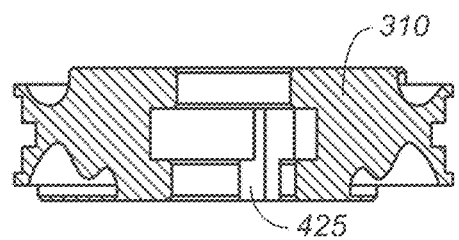
FIG. 16D depicts a cross-sectional side elevation view of FIG. 16A at the Section B-B, in accordance with an embodiment.

FIG. 16B depicts an enlarged cross-sectional top elevation view of the bottom 1415 of the piston assembly that is depicted in FIG. 14B, in accordance with an embodiment. FIG. 16B shows the bypass ports 320 and the flow channels 305. Section C-C is also marked on FIG. 16A and shown in a cross-sectional view of the piston assembly in FIG. 16D. FIG. 16D shows the flow channels 305.

FIG. 16C depicts an enlarged cross-sectional side elevation view of the piston assembly, in accordance with an embodiment. FIG. 16C shows the piston 310 and detail 1605. FIG. 16F depicts an enlarged view of the detail 1605, showing the piston 310, in accordance with an embodiment.

FIG. 16D depicts a cross-sectional side elevation view of FIG. 16A at the Section B-B, in accordance with an embodiment. FIG. 16D shows the piston 310.

Figure 16E:
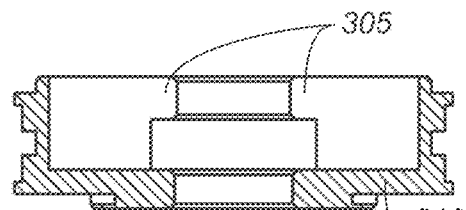
FIG. 16E depicts a cross-sectional side elevation view of FIG. 16B at the Section C-C, in accordance with an embodiment.
Figure 16F:
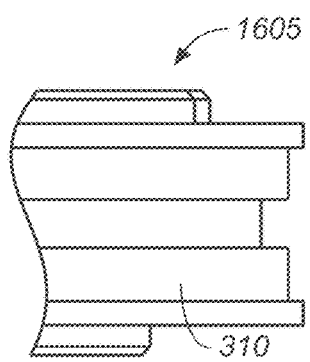
FIG. 16F depicts an enlarged side perspective* view of the detail 1605, showing the piston 310, in accordance with an embodiment.

FIG. 16E depicts a cross-sectional side elevation view of FIG. 16B at the Section C-C, in accordance with an embodiment. FIG. 16E shows the flow channels 305 and the piston 310.

FIG. 17A depicts a perspective view of a shaft 205, in accordance with an embodiment. FIG. 17A also shows detail 1525 (of FIG. 15B) and detail 1530 (of FIG. 15B).

FIG. 17B depicts a cross-sectional side elevation view of the shaft 205 of FIG. 17A, in accordance with an embodiment. FIG. 17C depicts an enlarged view of the detail 1705 of FIG. 17B, in accordance with an embodiment. FIG. 17C also shows passageway 126 (shaft ports).

FIG. 17D depicts an enlarged view of the detail 1525 of FIG. 15B and FIG. 17A, in accordance with an embodiment. FIG. 17E depicts an enlarged view of the detail 1530 of FIG. 15B and FIG. 17A, in accordance with an embodiment. FIG. 17E shows passageway 126.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What is claimed is:

1. A vehicle suspension damper comprising:
   a cylinder coupled to an eyelet assembly;
   a piston assembly disposed within said cylinder;
   an adjuster coupled with said piston assembly, wherein said piston assembly compresses fluid as it moves within said cylinder and said adjuster obstructs a fluid flow from a first side of a piston of said piston assembly to a second side of said piston, wherein said adjuster comprises:
   a shaft having an opening formed therethrough;
   a flow distributor disposed within said piston;

a rotatable valve disposed within said opening of said shaft, said rotatable valve comprising:
  a second cylinder, said second cylinder having an aperture formed through a surface of said second cylinder, said second cylinder defining a path for flow of said fluid therethrough;
  a control rod having a first end and a second end, said second end of said control rod coupled to said second cylinder;
  a motive source coupled with said rotatable valve, said motive source configured for providing input, wherein in response to said input, said rotatable valve rotates from said first position to said second position; and
  a damping adjustment lever coupled with said first end of said control rod, said damping adjustment lever configured to move said second cylinder from said first position to said second position, said first position orienting said aperture with said flow distributor such that a fluid flow path is created, said second position orienting said aperture with said flow distributor such that said fluid flow path is more restrictive when in said second position;
a rebound port disposed within said piston assembly, said rebound port configured to allow fluid to bypass said rotatable valve during a rebound stroke of said piston assembly; a needle extending inwardly of said cylinder and having an end thereof positioned for receipt within a bore during at least a portion of movement of said piston during said compression stroke of said piston, said bore disposed within said shaft;
a valve disposed at an opening of said bore, said valve comprising:
  a seat;
  a retainer clip;
  a check valve disposed between said seat and said retainer clip, said check valve having an inner diameter for receiving said needle therethrough, said inner diameter of said check valve having a size such that an annular clearance exists between said inner diameter of said check valve and an outer diameter of said needle, an amount of said annular clearance determining a damping rate of said valve; wherein the retainer clip is located between the check valve and the shaft, said check valve having a first surface facing said retainer clip, said first surface of said check valve having slots formed therein, said slots configured to prevent said first surface of said check valve from sealing against said retainer clip such that said fluid is permitted to flow through said bore during said rebound stroke when said piston assembly moves within a bottom out zone of said vehicle suspension damper; and
a fluid reservoir fluidically coupled to said cylinder, said fluid reservoir enclosing:
  a fluid chamber configured to receive said fluid from said cylinder;
  a volume of compressible fluid; and
  a floating piston disposed between said fluid chamber and said volume of compressible fluid, said floating piston movably separating said fluid chamber and said volume of compressible fluid.

2. The vehicle suspension damper of claim 1, wherein said control rod is rotationally fixed to said damping adjustment lever and said rotatable valve, wherein said control rod rotationally responds to said movement of said damping adjustment lever by rotating said rotatable valve in proportion to said movement.

3. The vehicle suspension damper of claim 1, wherein said input comprises:
  an electric input.

4. The vehicle suspension damper of claim 1, wherein said input comprises:
  a hydraulic input.

5. The vehicle suspension damper of claim 1, wherein said control rod is coupled with said motive source and said rotatable valve, wherein said control rod rotationally responds to said input from said motive source by rotating said rotatable valve according to said input.

6. An adjustment system for adjusting a flow of fluid through a vehicle suspension damper, said adjustment system comprising:
  a shaft having an opening formed therethrough;
  a flow distributor disposed within a piston;
  a rotatable valve disposed within said opening of said shaft, said rotatable valve comprising:
    a cylinder, said cylinder having an aperture formed through a surface of said cylinder, said cylinder defining a path for flow of said fluid therethrough;
    a control rod having a first end and a second end, said second end of said control rod coupled to said cylinder;
    a motive source coupled with said rotatable valve, said motive source configured for providing input, wherein in response to said input, said rotatable valve rotates from said first position to said second position; and
    a damping adjustment lever coupled with said first end of said control rod, said damping adjustment lever configured to move said cylinder from a first position to a second position, said first position orienting said aperture with said flow distributor such that a fluid flow path is created wherein said flow path, said second position orienting said aperture with said flow distributor such that said fluid flow path is more restrictive when in said second position;
  a rebound port disposed within said piston, said rebound port configured to allow fluid to bypass said rotatable valve during a rebound stroke of said piston;
  a needle extending inwardly of said vehicle suspension damper and having an end thereof positioned for receipt within a bore during at least a portion of movement of said piston during said compression stroke of said piston, said bore disposed within said shaft; and
  a valve disposed at an opening of said bore, said valve comprising:
    a seat;
    a retainer clip; and
    a check valve disposed between said seat and said retainer clip, said check valve having an inner diameter for receiving said needle therethrough, said inner diameter of said check valve having a size such that an annular clearance exists between said inner diameter of said check valve and an outer diameter of said needle, an amount of said annular clearance determining a damping rate of said valve, said check valve having a first surface facing said retainer clip, said first surface of said check valve having slots formed therein, said slots configured to prevent said first surface of said check valve from sealing against said retainer clip such that said fluid is permitted to flow through said bore during said rebound stroke when said piston moves within a bottom out zone of said vehicle suspension damper; and a fluid reservoir fluidically coupled to said cylinder, said fluid reservoir enclosing:
- a fluid chamber configured to receive said fluid from said cylinder;
- a volume of compressible fluid; and
- a floating piston disposed between said fluid chamber and said volume of compressible fluid, said floating piston movably separating said fluid chamber and said volume of compressible fluid.

7. The adjustment system of claim 6, wherein said adjustment system is coupled to said piston positioned within a vehicle suspension damper cylinder, wherein said piston compresses said fluid as said piston moves within said vehicle suspension damper cylinder.

8. The adjustment system of claim 6, further comprising:
said motive source configured for providing input, wherein in response to said input, said control rod rotationally responds to said input from said motive source by rotating said rotatable valve according to said input.

9. The adjustment system of claim 6, wherein said input comprises:
an electric input.

10. The adjustment system of claim 6, wherein said input comprises:
a hydraulic input.

11. A vehicle suspension damper comprising:
a cylinder coupled to an eyelet assembly;
a piston assembly disposed within said cylinder;
an adjuster coupled with said piston assembly, wherein said piston assembly compresses fluid as it moves within said cylinder and said adjuster obstructs a fluid flow from an opening on a first side of a piston of said piston assembly to an opposite opening on a second side of said piston, wherein said adjuster comprises:
a shaft having an opening formed therethrough;
a flow distributor disposed within said piston;
a rotatable valve disposed within said opening of said shaft, said rotatable valve comprising:
a second cylinder, said second cylinder having an aperture formed through a surface of said second cylinder, said second cylinder defining a path for flow of said fluid therethrough;
a control rod having a first end and a second end, said second end of said control rod coupled to said second cylinder; and
a damping adjustment lever coupled with said first end of said control rod, said damping adjustment lever configured to move said second cylinder from a first position to a second position, said first position orienting said aperture with said flow distributor such that a fluid flow path is created, said second position orienting said aperture with said flow distributor such that said fluid flow path is more restrictive when in said second position;

a rebound port disposed within said piston assembly, said rebound port configured to allow fluid to bypass said rotatable valve during a rebound stroke of said piston assembly;

a needle extending inwardly of said vehicle suspension damper and having an end thereof positioned for receipt within a bore during at least a portion of movement of said piston during said compression stroke of said piston, said bore disposed within said shaft; and a valve disposed at an opening of said bore, said valve comprising:
a seat;
a retainer clip; and
a check valve disposed between said seat and said retainer clip, said check valve having an inner diameter for receiving said needle therethrough, said inner diameter of said check valve having a size such that an annular clearance exists between said inner diameter of said check valve and an outer diameter of said needle, an amount of said annular clearance determining a damping rate of said valve, said check valve having a first surface facing said retainer clip, said first surface of said check valve having slots formed therein, said slots configured to prevent said first surface of said check valve from sealing against said retainer clip such that said fluid is permitted to flow through said bore during said rebound stroke when said piston moves within a bottom out zone of said vehicle suspension damper; and a fluid reservoir fluidically coupled to said cylinder, said fluid reservoir enclosing:
a fluid chamber configured to receive said fluid from said cylinder;
a volume of compressible fluid; and
a floating piston disposed between said fluid chamber and said volume of compressible fluid, said floating piston movably separating said fluid chamber and said volume of compressible fluid.

12. The vehicle suspension damper of claim 11 further comprising:
an indexing mechanism coupled to said damping adjustment lever, said indexing mechanism configured for retaining said second cylinder within intermediate positions between said first position and said second position, thereby providing selectable modal damping adjustments.

* * * * *